(12) United States Patent
Chang et al.

(10) Patent No.: US 8,914,071 B2
(45) Date of Patent: Dec. 16, 2014

(54) MOBILE COMMUNICATION TERMINAL AND OPERATION METHOD THEREOF

(75) Inventors: Minkyoung Chang, Seoul (KR); Kyunghye Seo, Seoul (KR); Joowoo Lee, Seoul (KR); Songyi Baek, Seoul (KR)

(73) Assignee: LG Electronics Inc., Seoul (KR)

(*) Notice: Subject to any disclaimer, the term of this patent is extended or adjusted under 35 U.S.C. 154(b) by 485 days.

(21) Appl. No.: 13/240,777

(22) Filed: Sep. 22, 2011

(65) Prior Publication Data

US 2012/0315882 A1 Dec. 13, 2012

(30) Foreign Application Priority Data

Jun. 7, 2011 (KR) .................. 10-2011-0054594

(51) Int. Cl.
H04B 1/38 (2006.01)
H04M 3/42 (2006.01)
H04M 1/725 (2006.01)
H04L 29/08 (2006.01)

(52) U.S. Cl.
CPC ...... *H04M 1/72522* (2013.01); *H04M 1/72586* (2013.01); *H04M 1/72525* (2013.01); *H04L 67/303* (2013.01)
USPC ........................................ 455/566; 455/414.1

(58) Field of Classification Search
CPC . H04L 67/306; H04L 41/22; H04M 15/8038; H04M 15/885; H04M 1/72572; H04M 1/72583; H04W 64/00; H04W 48/18; H04W 36/00; H04W 88/06; G06Q 30/0269; G06F 3/04817; G06F 3/048; G06F 3/0482; G06F 3/0484
USPC .................................. 455/414.1, 414.4, 566
See application file for complete search history.

(56) References Cited

U.S. PATENT DOCUMENTS

| | | | | |
|---|---|---|---|---|
| 2004/0253947 A1* | 12/2004 | Phillips et al. | ............. | 455/422.1 |
| 2006/0062149 A1 | 3/2006 | Bednasz | | |
| 2007/0171450 A1* | 7/2007 | Yoshida | ........................ | 358/1.13 |
| 2009/0178005 A1* | 7/2009 | Jheng | ............................. | 715/825 |
| 2010/0248719 A1* | 9/2010 | Scholaert | ....................... | 455/434 |
| 2012/0140255 A1* | 6/2012 | Tanaka | ......................... | 358/1.13 |

FOREIGN PATENT DOCUMENTS

| | | |
|---|---|---|
| EP | 2 073 526 | 6/2009 |
| EP | 2073526 A1 * | 6/2009 |
| KR | 10-2010-123336 | 11/2010 |
| KR | 10-2011-0033469 | 3/2011 |
| WO | WO 2009/090488 | 7/2009 |

OTHER PUBLICATIONS

European Search Report dated Sep. 14, 2012 for Application 12001186.1.
Korean Office Action dated Oct. 29, 2012 for Application 10-2011-0054594.

* cited by examiner

*Primary Examiner* — George Eng
*Assistant Examiner* — Jing Gao
(74) *Attorney, Agent, or Firm* — KED & Associates LLP

(57) ABSTRACT

A mobile communication terminal and an operation method may be provided. This may include connecting to a first communication network, and executing an adaptive application that allows the mobile terminal to display either a first user interface screen or a second user interface screen depending on the connected communication network. This may also include connecting to a second communication network, determining that the mobile communication terminal is connected to the second communication network, and while executing the adaptive application and in response to the determination that the mobile terminal is connected to the second communication network, displaying a second user interface screen corresponding to the second communication network.

16 Claims, 22 Drawing Sheets

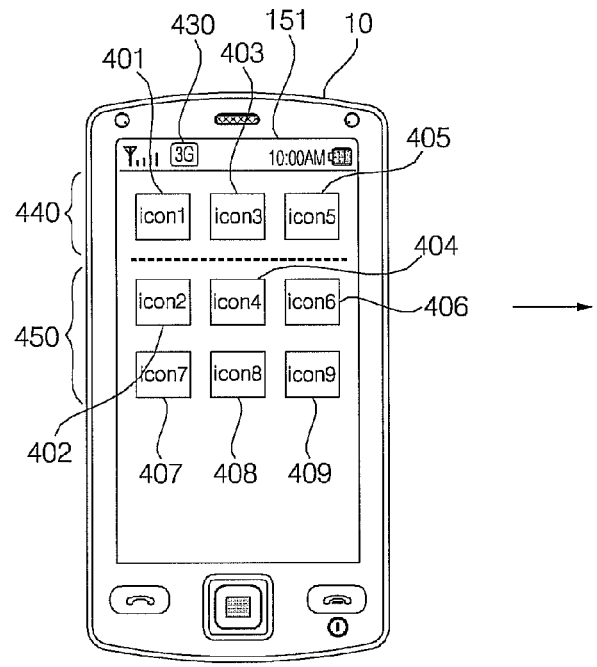
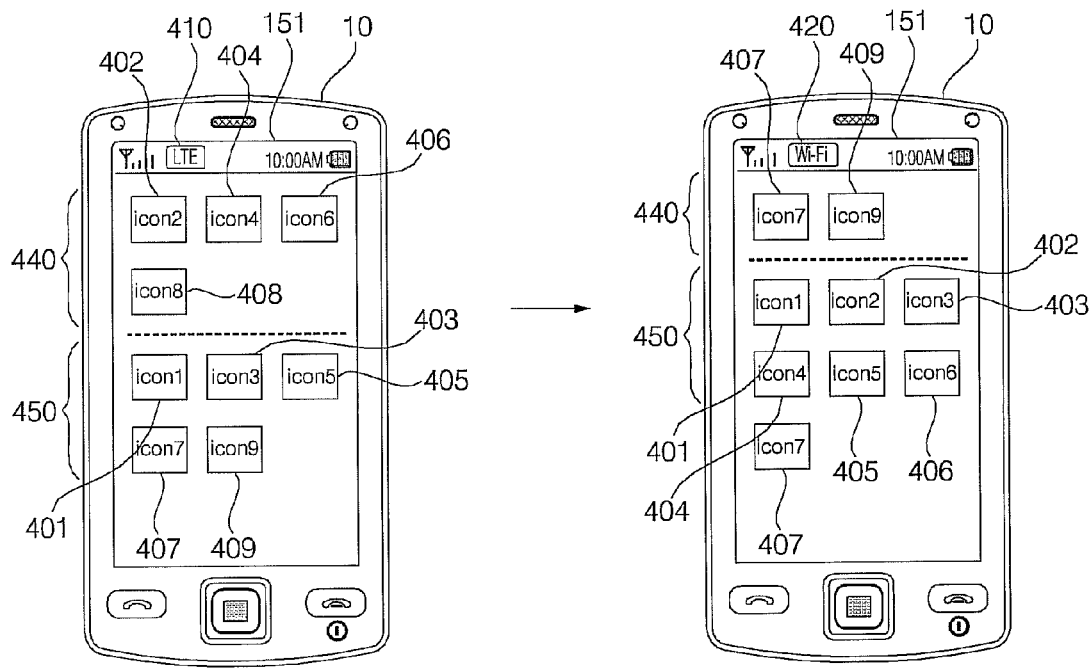

FIG. 11
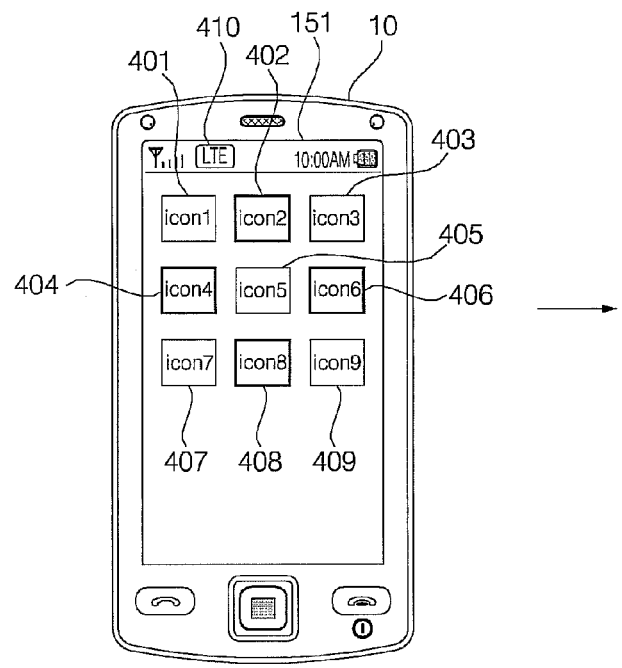
(a)
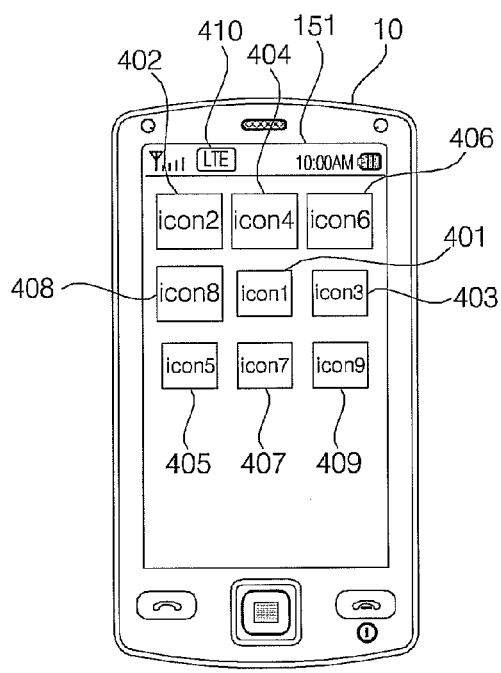
(b)
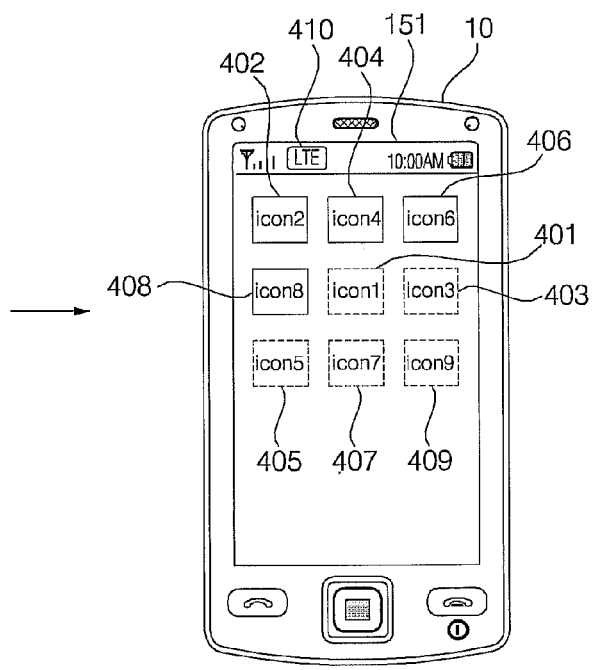
(c)

FIG. 13
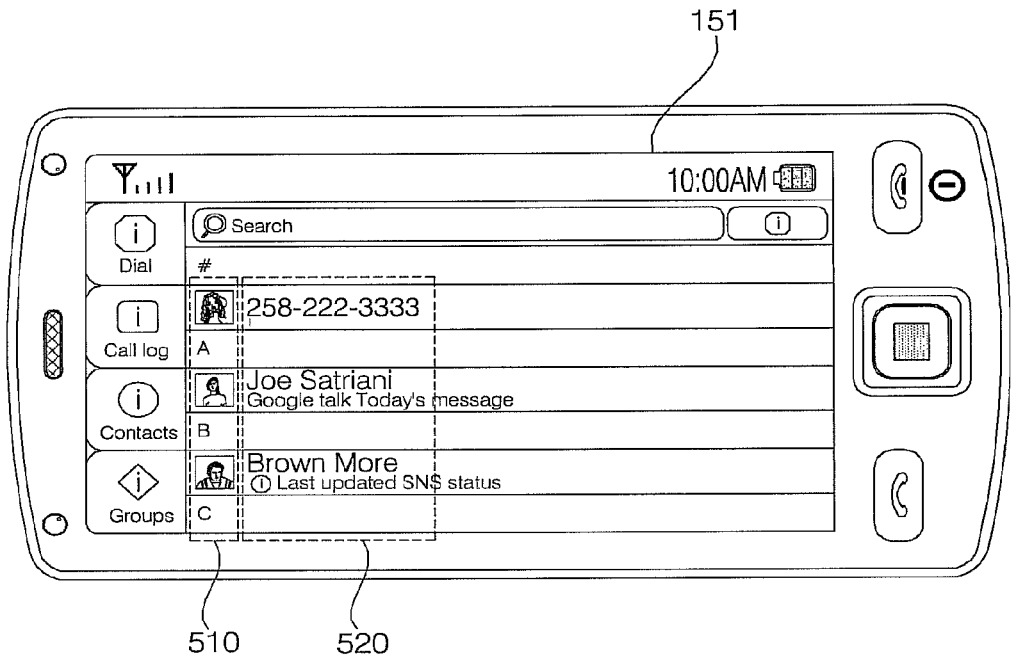
(a)
↓ LTE network
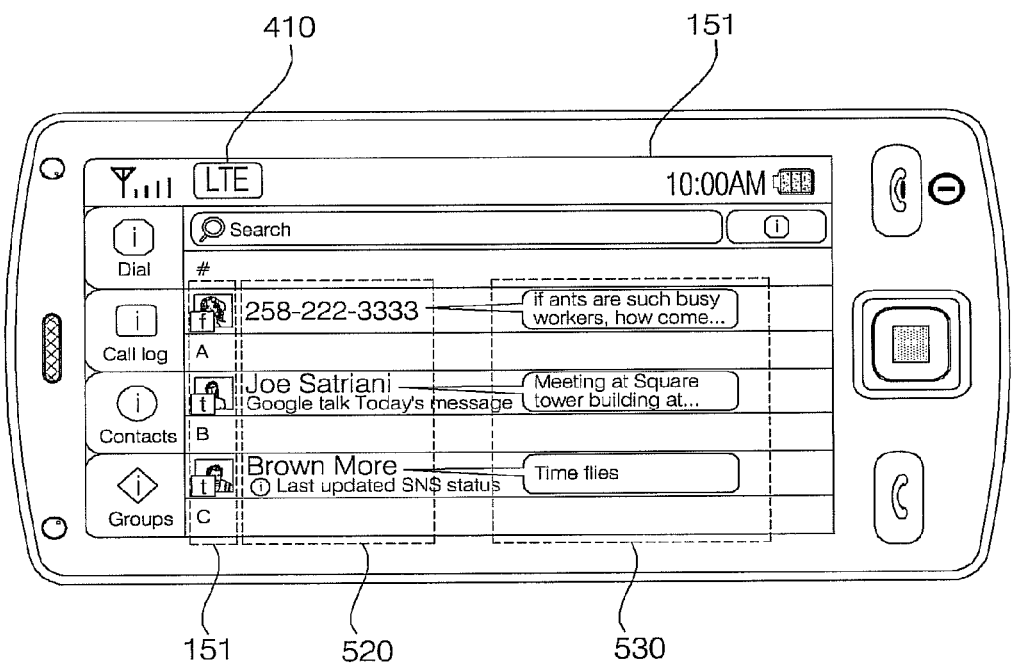
(b)

FIG. 22
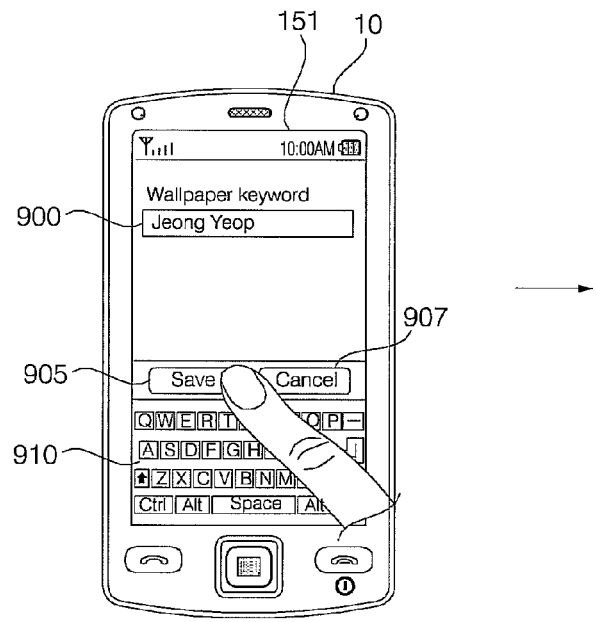
(a)
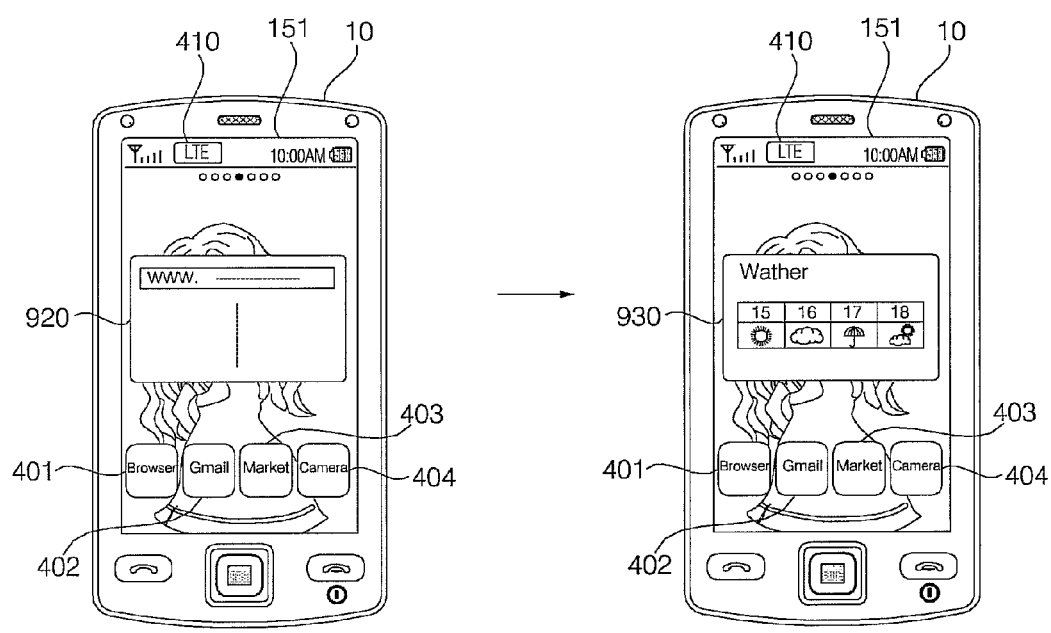
(b)  (c)

FIG. 23
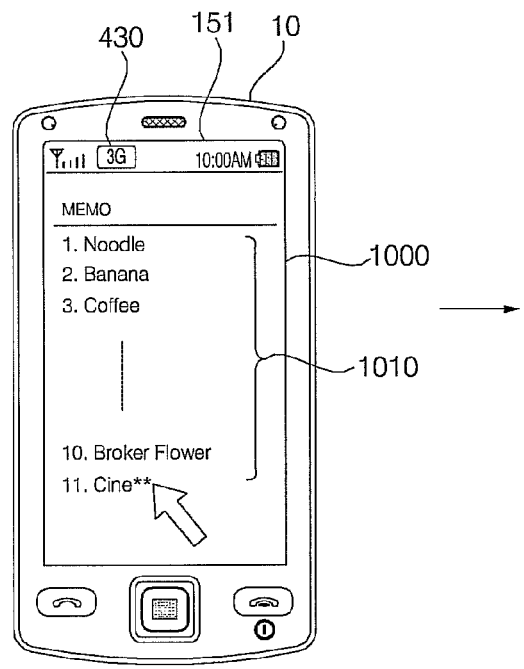
(a)
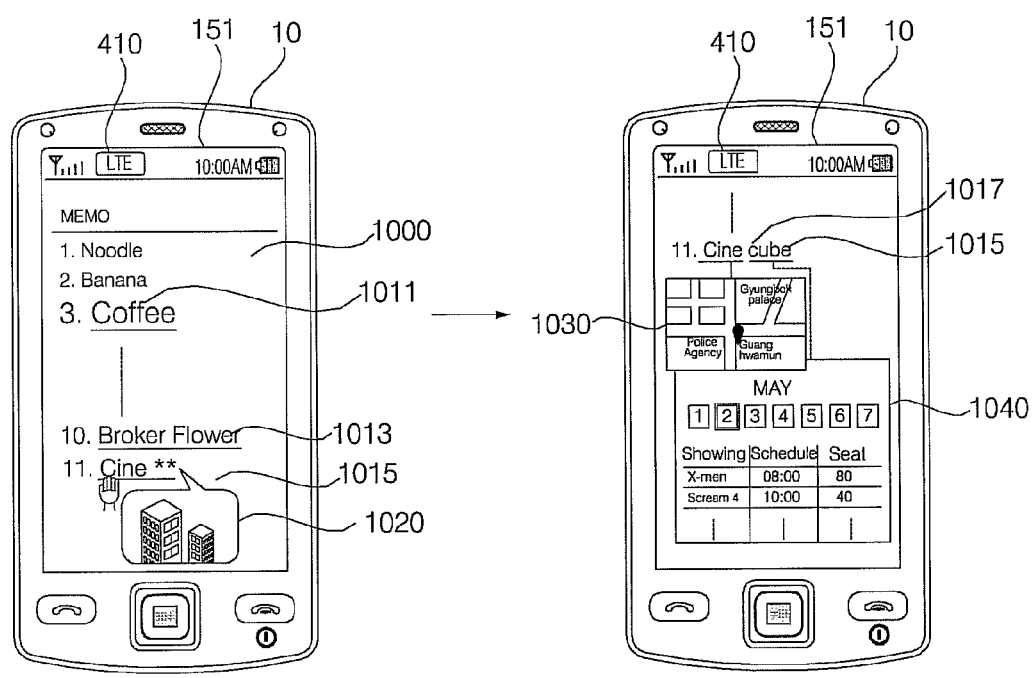
(b)　　　　　　　(c)

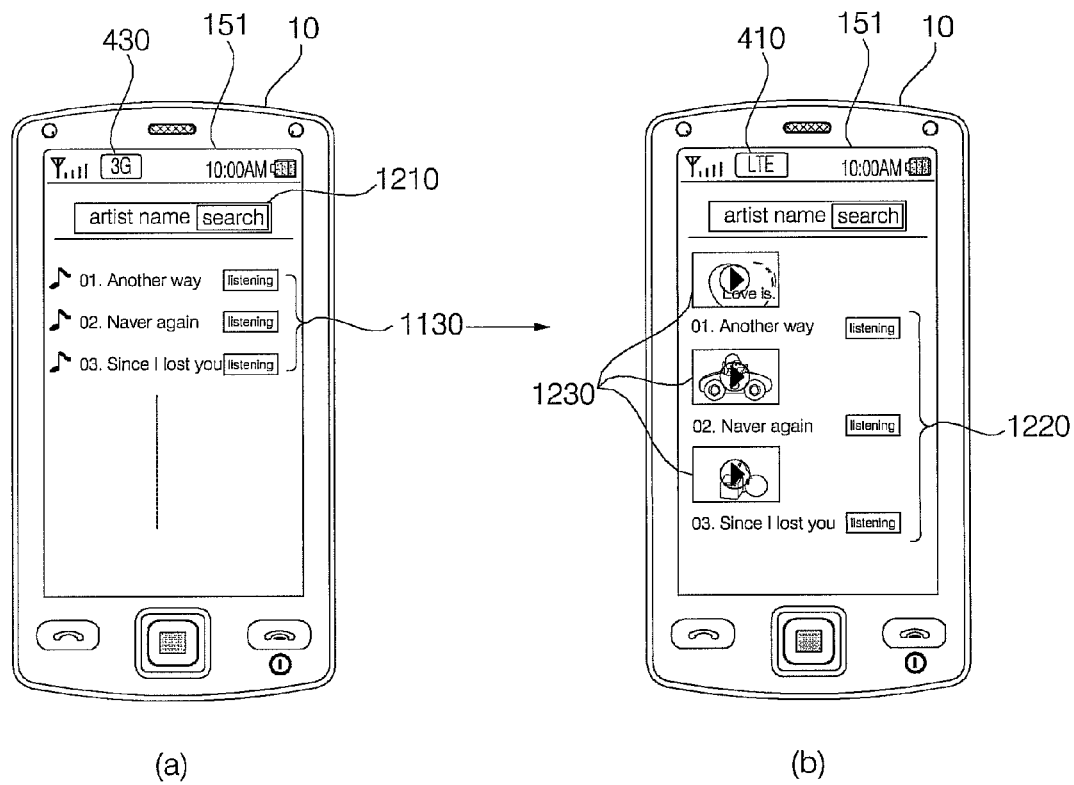

MOBILE COMMUNICATION TERMINAL AND OPERATION METHOD THEREOF

CROSS-REFERENCE TO RELATED APPLICATION(S)

This application claims priority under 35 U.S.C. §119 to Korean Application No. 10-2011-0054594 filed Jun. 7, 2011, whose entire disclosure is hereby incorporated by reference.

BACKGROUND

1. Field

The present invention relates to a mobile communication terminal and an operation method thereof, and more particularly, to a mobile communication terminal, which provides different user interfaces depending on the type of communication network, and an operation method thereof.

2. Background

A mobile communication terminal is a portable device that can be carried around and has one or more functions such as voice and video call communication, sending and receiving messages simultaneously to and from other terminals, inputting and outputting information, chatting, storing data, and the like. As the functionality of the mobile communication terminal has been diversified, a mobile communication terminal having various complicated functions, such as taking pictures or video, music or video file playback, games, broadcast reception, and the like has been implemented as an all-in-one multimedia player.

Various novel attempts have been made in terms of hardware or software to achieve more complicated functions of the mobile communication terminal implemented as a multimedia player. One example is provision of a user interface environment allowing the user to easily and conveniently find and select a desired function.

As 3GPP (3rd Generation Partnership Project) mobile communication systems based on WCDMA (Wideband Code Division Multiple Access) radio access technology are currently widespread, high-speed transmission of large-volume data and the provision of seamless service become available. In line with this, the development of multimedia functions of mobile communication terminals suitable for such a wireless communication environment is actively in progress.

Under this network environment, the quality of video calls can be further improved, and large volumes of data can be transmitted at high speed. This allows for the differentiation of user interfaces. With the provision of differentiated user interfaces, there is demand for mobile communication terminal technologies offering improvements in multimedia player functions.

BRIEF DESCRIPTION OF THE DRAWINGS

The embodiments will be described in detail with reference to the following drawings in which like reference numerals refer to like elements wherein:

FIGS. 8 to 12 are views illustrating a method for displaying icons on a mobile communication terminal according to an exemplary embodiment of the present invention; and FIGS. 13 to 25 are views illustrating different screens displayed on the mobile communication terminal depending on the type of communication network when a variety of applications are executed according to an exemplary embodiment of the present invention.

DETAILED DESCRIPTION

Hereinafter, the present invention will be described in more detail with reference to the drawings.

A mobile communication terminal as described in this specification may include a mobile phone, a smartphone, a laptop computer, a digital broadcast terminal, a personal digital assistant (PDA), a portable multimedia player (PMP), a camera, a navigator, a tablet computer, an e-book reader, and the like. The terms "module" and "unit," when attached to the names of components are used herein to help the understanding of the components and thus they should not be considered as having specific meanings or roles. Accordingly, the terms "module" and "unit" may be used interchangeably.

Figure 1:
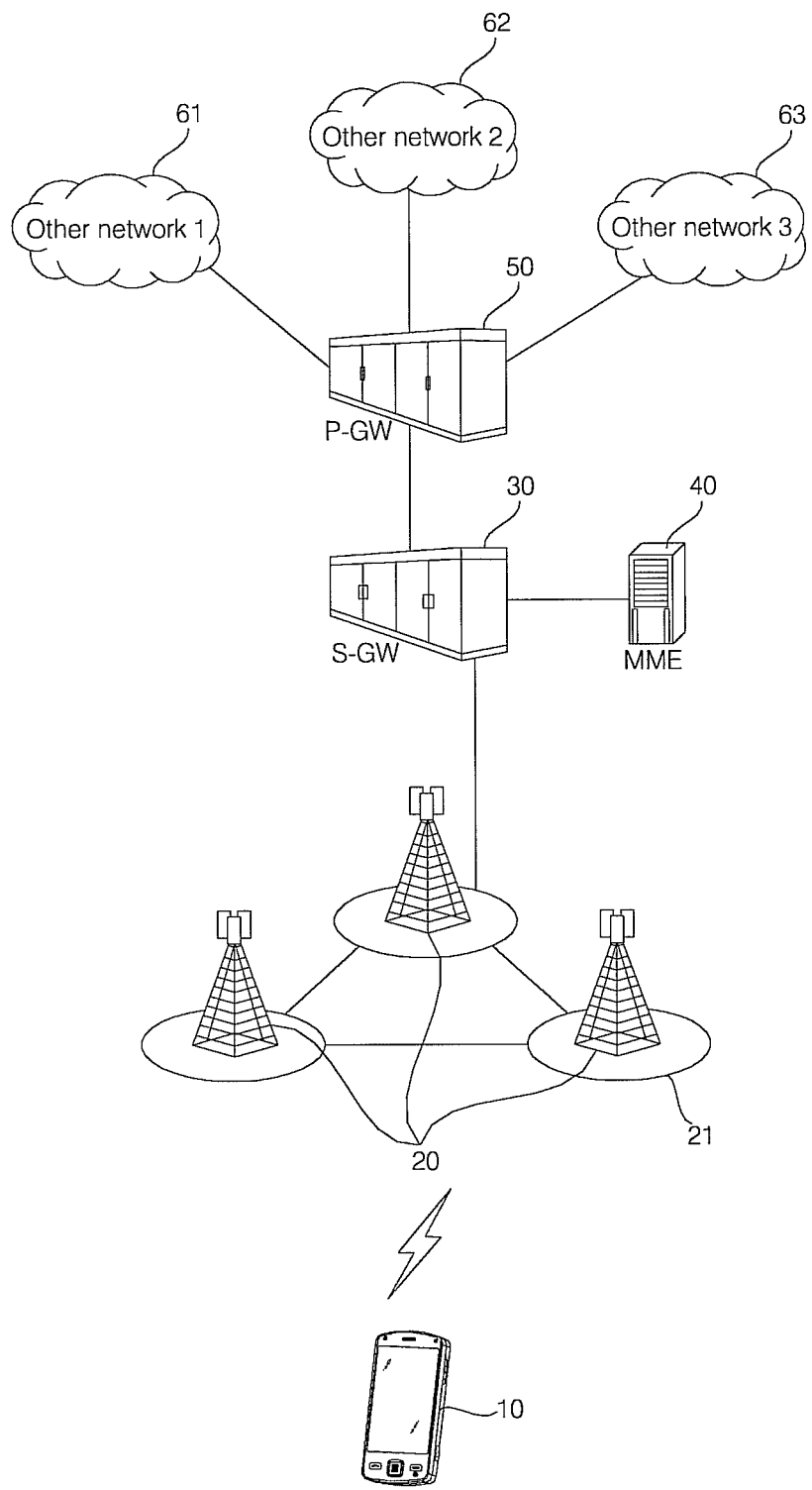
FIG. 1 is a diagram illustrating a structure of a wireless communication system in which a mobile communication terminal according to an exemplary embodiment of the present invention operates.

FIG. 1 is a diagram illustrating a structure of a wireless communication system in which a mobile communication terminal 10 according to an exemplary embodiment of the present invention operates. The wireless communication system shown in FIG. 1 may be a network structure of an E-UMTS (Evolved-Universal Mobile telecommunications System) which is also referred to as an LTE (Long-Term Evolution) system.

A user equipment (UE) 10 can be fixed or mobile. The UE 10 may also be referred to as an MS (Mobile Station), a UT (User Terminal), an SS (Subscriber Station), or a wireless device. Generally, the BS 20 is a fixed station that communicates with the UE 10 and may also be referred to as an e-NB (evolved-NodeB), a BTS (Base Transceiver System), or an access point. There are one or more cells within the coverage of the BS 20.

Interfaces for transmitting user traffic or control traffic may be used between BSs 20. Hereinafter, downlink means communication from the BS 20 to the UE 10, and uplink means a communication from the UE 10 to the BS 20.

The BSs 20 are interconnected with each other by means of an X2 interface. The BSs 20 are also connected by means of the S1 interface to the EPC (Evolved Packet Core), more specifically, to the MME (Mobility Management Entity)/Serving Gateway (S-GW) 30. The S1 interface supports a many-to-many relation between MME/S-GW 30 and the BS 20.

A network interface is set up by setting up the S1 interface connecting a mobility management entity (MME) at the center of the system and the BS 20 and the X2 interface serving as a network line for direction communication with BSs 20 of other cells currently present in the system. The S1 interface allows the BS 20 to send and receive Operation and Management (OAM) information for supporting the movement of the UE 10 by exchanging signals with the MME. Moreover, the X2 interface plays the role of exchanging a signal for fast handover between BSs 20, load indicator information, and information for self-optimization.

The BS 20 performs the following functions: (1) functions for radio resource management such as radio bearer (RB) control, radio admission control, connection mobility control, dynamic resource allocation to the UE 10; (2) IP (Internet Protocol) header compression and encryption of user data stream; (3) routing of user plane data to the S-GW; (4) scheduling and transmission of paging messages; (5) scheduling and transmission of broadcast information; and (6) measurement and measurement reporting configuration for mobility and scheduling.

The MME 40 is in charge of controlling of signals between the BS 20 and the S-GW, and determines where to route incoming data from the UE 10. The MME performs the following functions:

distribution of paging messages to BSs; (2) NAS (Non-Access Stratum) signaling, NAS signaling security, ciphering/deciphering, and integrity protection; (3) controlling the intra-LTE handover; (4) tracking area list management; (5) P-GW and S-GW selection for a UE; (6) MME selection for handovers with MME change; (7) SGSN selection for handovers to 2G or 3G 3GPP access network; (8) idle mode UE tracking and paging control; (9) authentication/authorization of the user via HSS interworking; (10) lawful interception of signaling; (11) UE reachability procedures; (12) generation and allocation of temporary identities to UE.

The S-GW hosts anchoring of mobility of the UE 10 between BSs 20 and between a 3GPP network and an E-UTRAN. The PDN gateway (P-GW) 50 serves as a contact point at which data traffic in LTE enters an IMS, and hosts anchoring of mobility of the UE 10 between the LTE and a non-3GPP network. Moreover, the P-GW 50 is also connected to other communication networks 61, 62, and 63. These communication networks may include a telephone network, a wired internet network, etc.

The SGW is connected to the PDN-GW via the S5 interface, which can support two distinct protocols, either the GPRS tunneling protocol (GTP) or the proxy mobile IPv6 (PMIPv6) protocol. When using PMIP, the SGW also has a direct connection with the PCRF via the Gxc interface to supplement the lack of event reporting not available in the PMIPv6 protocol. PMIPv6 maintains IP connectivity instead of requiring an EPS bearer. The EPS bearer goes from the UE to the PDN-GW with appropriate QoS.

The PDN-GW is the termination point of the packet data interface. It provides the anchoring function for sessions with external packet data networks. A critical function of the PDN-GW is enforcement of per-user-based packet filtering, allowing gating and rate enforcement policies as well as service level charging.

User-plane LTE traffic is carried over service data flows (SDFs), which are aggregated over a set of virtual connections that match a specific filter policy or template. SDFs are in turn carried over EPS bearers. An EPS bearer uniquely identifies data flows that receive a common QoS treatment between a UE and a PDN GW. The functions of the P-GW 50 and the S-GW 30 are summarized as follows:

Mobility anchoring between LTE and non-3GPP technologies (e.g., WiMax, 3GPP2); 2) UE connection management; 3) Policy enforcements via interworking with PCRF; 4) charging support; 5) Per-user based packet filtering; 6) Lawful interception; 7) UE IP allocation; and 8) Packet screening.

Figure 2:
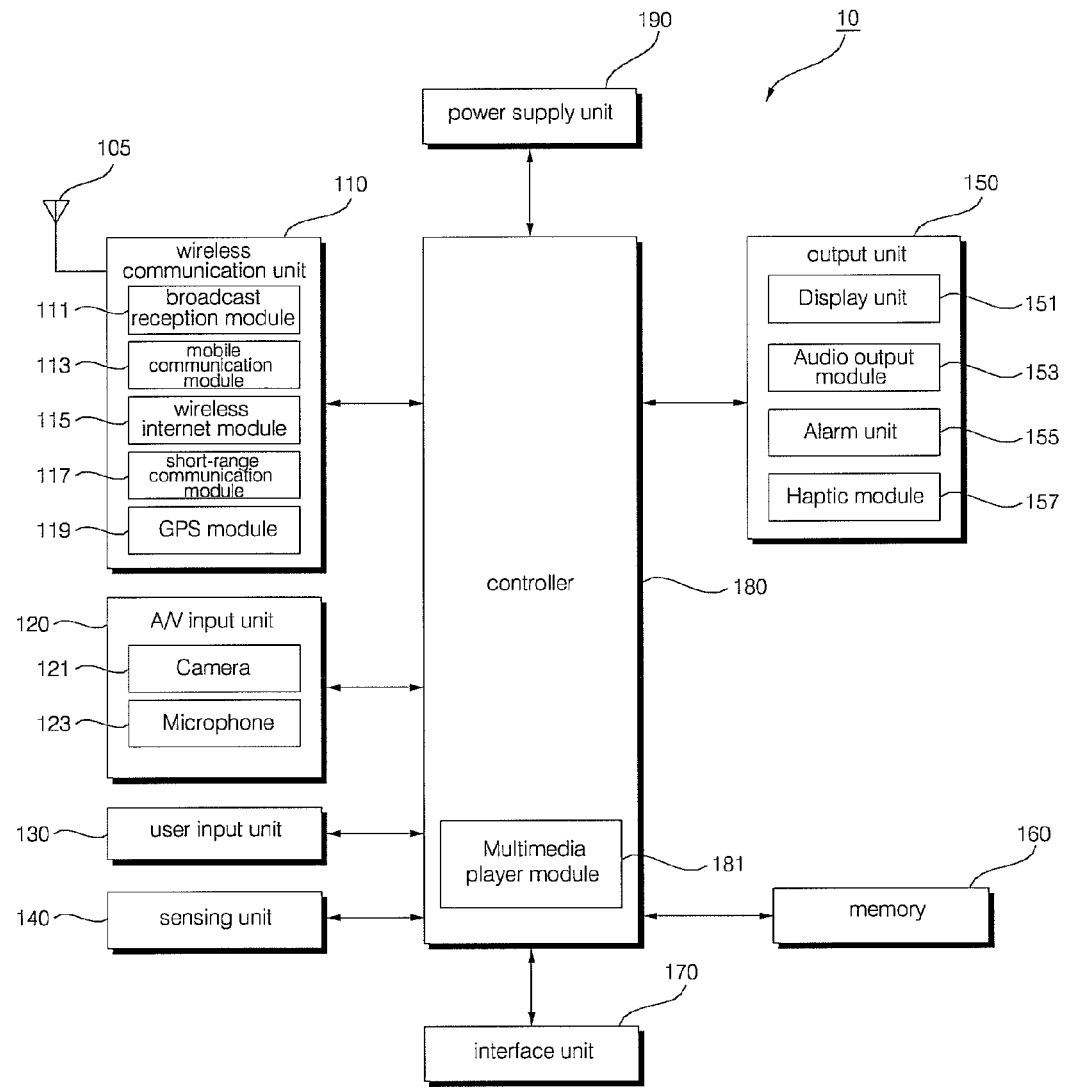
FIG. 2 is a block diagram of the mobile communication terminal according to one exemplary embodiment of the present invention.

FIG. 2 illustrates a block diagram of a mobile communication terminal 10 according to an exemplary embodiment of the present invention. Referring to FIG. 2, the mobile communication terminal 10 according to the exemplary embodiment of the present invention will be described below in the aspect of components according to functions.

Referring to FIG. 2, the mobile communication terminal 10 may include a wireless communication unit 110, an audio/video (A/V) input unit 120, a user input unit 130, a sensing unit 140, an output unit 150, a memory 160, an interface unit 170, a controller 180, and a power supply unit 190. Two or more of these components can be incorporated into a single unit, or a component can be divided into two or more smaller units.

The wireless communication unit 110 may include a broadcast reception module 111, a mobile communication module 113, a wireless internet module 115, a short-range communication module 117, and a global positioning system (GPS) module 119.

The broadcast reception module 111 may receive a broadcast signal and/or broadcast-related information from an external broadcast management server through a broadcast channel. The broadcast channel may be a satellite channel or a terrestrial channel. The broadcast management server may be a server which generates broadcast signals and/or broadcast-related information and transmits the generated broadcast signals and/or the generated broadcast-related information, or a server which receives and then transmits previously-generated broadcast signals and/or previously-generated broadcast-related information to a terminal.

Examples of the broadcast signals include a TV broadcast signal, a radio broadcast signal, a data broadcast signal, or a combination of a data broadcast signal and either a TV broadcast signal or a radio broadcast signal. The broadcast-related information may be provided through a mobile communication network. In this case, the broadcast-related information may be received by the mobile communication module 113. The broadcast-related information may come in various forms, for example, electronic program guide (EPG) of digital multimedia broadcasting (DMB) or electronic service guide (ESG) of digital video broadcast-handheld (DVB-H).

The broadcast reception module 111 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast reception module 111 may be configured for other types of broadcasting systems in addition to those set forth herein. The broadcast signals and/or broadcast-related information received through the broadcast reception module 111 can be stored in the memory 160.

The mobile communication module 113 transmits and receives wireless signals to and from at least one of a base station, an external terminal, and a server through a mobile communication network. The wireless signals may include various types of data according to whether the mobile communication terminal 100 transmits or receives voice call signals, video call signals, or text/multimedia messages.

The wireless Internet module 115 may be a module for wirelessly accessing the Internet. The wireless Internet module 115 may be embedded in the mobile communication terminal 100 or may be installed in an external device. The wireless Internet module 115 may use various wireless Internet techniques such as wireless fidelity (WiFi), wireless broadband (Wibro), world interoperability for microwave access (Wimax) or high-speed downlink Packet Access (HSDPA).

The short-range communication module 117 refers to a module for local area communication. Local area communication technology can employ Bluetooth, radio frequency identification (RFID), infrared data association (IrDA), ultra wideband (UWB), ZigBee, or the like.

The GPS module 119 receives position information from a plurality of GPS satellites.

The A/V input unit 120 is adapted to input audio signals or video signals. The A/V input unit 120 can include a camera 121, a microphone 123, and so on. The camera 121 process image frames such as still images or motion images, which are captured by an image sensor during a video call mode or an image capturing mode. The processed image frames can be displayed on a display unit 151.

The image frames processed by the camera 121 can be stored in the memory 160 or transmitted to the outside through the wireless communication unit 110. The camera 121 can be provided in plural number according to the configuration of the mobile communication terminal.

The microphone 123 receives external sound signals during a call mode, a recording mode, or a voice recognition mode with the use of a microphone and may convert the sound signals into electrical sound data. In the call mode, the mobile communication module 113 may convert the electrical sound data into data that can be readily transmitted to a mobile communication base station and then output the data obtained by the conversion. The microphone 123 may use various noise removal algorithms to remove noise that may be generated during the reception of external sound signals.

The user input unit 130 generates key input data based on user input for controlling the operation of the terminal. The user input unit 130 may be implemented as a keypad, a dome switch, a touch pad (static pressure/constant electricity), or the like that can receive commands or information based on a user's push or touch action, or the user input unit 130 may be implemented using a wheel or jog method of rotating a key or a method using a joystick, or a finger mouse. In particular, a layered structure of the touch pad and the display unit 151, which will be described later on, is referred to as a touch screen.

The sensing unit 140 generates a sensing signal for controlling the operation of the mobile communication terminal 100 by sensing a current status of the mobile communication device 100. The current status can include a closed state of the mobile communication terminal 100, the position of the mobile communication terminal 100, or whether the mobile communication terminal 100 is in touch with a user or not. For example, when the mobile communication terminal 100 is a slide phone, the sensing unit 140 senses whether the slide phone is open or closed. The sensing unit 140 may also sense whether power is being supplied by the power supply unit 190 and whether the interface unit 170 is connected to an external device.

The sensing unit 140 may include a detection sensor 141, a pressure sensor 143, and a motion sensor 145. The detection sensor 141 may determine whether there is an object nearby and approaching the mobile communication terminal 100 without any mechanical contact with the entity. More specifically, the detection sensor 141 may detect an object that is nearby and approaching by detecting a change in an alternating magnetic field or the rate of change of static capacitance. The sensing unit 140 may include two or more detection sensors 141 according to configurations.

The pressure sensor 143 may determine whether pressure is being applied to the mobile communication terminal 100 or may measure the level of pressure, if any, applied to the mobile communication terminal 100. The pressure sensor 143 may be installed in a certain part of the mobile communication terminal 100 where the detection of pressure is necessary depending on use environments. For example, the pressure sensor 143 may be installed in the display unit 151. In this case, it is possible to differentiate a typical touch input through the display unit 151 from a pressure touch input, which is generated using a higher pressure level than that used to generate a typical touch input, based on a signal output by the pressure sensor 143. In addition, it is possible to determine the level of pressure applied to the display unit 151 upon the detection of a pressure touch input based on a signal output by the pressure sensor 143.

The motion sensor 145 may determine the location and motion of the mobile communication terminal 100 using an acceleration sensor or a gyro sensor. An acceleration sensor for use in the motion sensor 145 is a type of device for converting an acceleration variation in a certain direction into an electric signal. With recent developments in micro-electromechanical system (MEMS) technology, acceleration sensors have been widely used in various products for various purposes ranging from detecting high values of acceleration such as car collisions as performed in airbag systems for automobiles to detecting low values of acceleration such as minute motions of the hand as performed in input means for gaming. In general, acceleration sensors representing two or three axial directions are incorporated into a single package. There are some cases when the detection of only one axial direction, for example, a Z-axis direction, is necessary. Thus, when an X- or Y-axis acceleration sensor, instead of a Z-axis acceleration sensor, is required, the X- or Y-axis acceleration sensor may be mounted on an additional substrate, and the additional substrate may be mounted on a main substrate.

Gyro sensors are sensors for measuring angular velocity, and may determine the relative direction of the rotation of the mobile communication terminal 100 to a reference direction.

The output unit 150 may output audio signals, video signals, and alarm signals. The output unit 150 may include the display unit 151, an audio output module 153, an alarm unit 155, and a haptic module 157.

The display unit 151 may display various information processed by the mobile communication terminal 100. For example, if the mobile communication terminal 100 is in a call mode, the display unit 151 may display a user interface (UI) or a graphic user interface (GUI) for making or receiving a call. If the mobile communication terminal 100 is in a video call mode or an image capturing mode, the display unit 151 can display captured or received images individually or simultaneously and also display a UI or a GUI.

If the display unit 151 and a touch pad form a layer structure together and are thus implemented as a touch screen, the display unit 151 may be used not only as an output device but also as an input device capable of receiving information in response to a touch input made by the user.

If the display unit 151 is implemented as a touch screen, the display unit 151 may also include a touch screen panel and a touch screen panel controller. The touch screen panel is a transparent panel attached onto the exterior of the mobile communication terminal 100 and may be connected to an internal bus of the mobile communication terminal 100. The touch screen panel keeps monitoring whether the touch screen panel is being touched by the user. Once a touch input to the touch screen panel is received, the touch screen panel transmits a number of signals corresponding to the touch input to the touch screen panel controller. The touch screen panel controller processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

The display unit 151 may include electronic paper (e-paper). E-paper is a type of reflective display technology and can provide excellent visual properties, including high resolution as is with ordinary ink on paper, wide viewing angles, and excellent visual properties. E-paper can be implemented on various types of substrates such as a plastic, metallic or paper substrate, and can display and maintain an image thereon even after power is cut off. In addition, e-paper can prolong the battery life of the mobile communication terminal 100 because it does not require a backlight power source. The display unit 151 may be implemented as e-paper by using electrostatic-charged hemispherical twist balls, electrophoretic deposition, or microcapsules.

The display unit 151 may include at least one of a liquid crystal display (LCD), a thin film transistor-liquid crystal display, an organic light-emitting diode, a flexible display, and a three-dimensional (3D) display. The mobile communication terminal 100 may include two or more display units 151 according to an implementation form of the mobile communication terminal 100. For example, the mobile communication terminal 100 may be equipped with both an external display unit (not shown) and an internal display unit (not shown).

The audio output module 153 may output audio data received by the wireless communication unit 110 during a call reception mode, a call mode, a recording mode, a voice recognition mode, or a broadcast reception mode, or may output audio data stored in the memory 160. In addition, the audio output module 153 may output various audio signals associated with the functions of the mobile communication terminal 100, such as receiving a call or a message. The audio output module 153 may include a speaker and a buzzer.

The alarm unit 155 may output an alarm signal indicating the occurrence of an event in the mobile communication terminal 100. Examples of the event include receiving a call signal, receiving a message, and receiving a key signal. The alarm unit 155 may also output signals to indicate the occurrence of events in different ways other than the audio or video signals. For example, the alarm unit 155 may output signals in a vibration form. When a call signal is received or a message is received, the alarm unit 155 may output a signal to indicate the reception of the call signal or the message. Alternatively, when a key signal is input, the alarm unit 155 may output a signal as a feedback to the input key signal. A user can perceive the occurrence of an event through a signal output by the alarm unit 155. It should be noted that a signal to indicate the occurrence of an event might also be output through the display unit 151 or the sound output module 153.

The haptic module 157 generates a variety of tactile effects which the user can sense. One typical example of the tactile effects that can be generated by the haptic module 157 is vibration. In the case that the haptic module 157 generates vibration as a tactile effect, the haptic module 157 may change intensity and pattern of generated vibration. Also, the haptic module 157 may combine different vibrations and output the combined vibration, or may sequentially output different vibrations.

In addition to vibration, the haptic module 157 may generate various tactile effects, such as a stimulus effect by an arrangement of pins that move perpendicularly to the touched skin surface, a stimulus effect by air blowing or suction through an air outlet or inlet, a stimulus effect through brushing of the skin surface, a stimulus effect through contact with an electrode, a stimulus effect using electrostatic force, and a stimulus effect through reproduction of thermal (cool/warm) sensation using an endothermic or exothermic element. The haptic module 157 may be implemented so as to allow the user to perceive such effects not only through direct tactile sensation but also through kinesthetic sensation of fingers, arms, or the like of the user. Two or more haptic modules 157 may be provided depending on how the mobile communication terminal 100 is constructed.

The memory 160 may store a program based on which the controller 180 perform a processing and controlling operation. Also, the memory 160 may temporarily store input or output data items (for example, a phonebook, messages, still images, motion images, and the like).

The memory 160 may include at least one of storage media including a flash memory type memory, a hard disk type memory, a multimedia card micro type memory, a card memory type memory (for example, an SD or XD memory), a random access memory (RAM), and a read-only memory (ROM). Also, the mobile communication terminal 100 may utilize web storage that performs a storage function of the memory 160 over the Internet.

The interface unit 170 functions to interface with all external devices connected to the mobile communication terminal 100. Examples of the external devices connected to the mobile communication terminal 100 include a wired/wireless headset, an external battery charger, a wired/wireless data port, a memory card, a card socket such as a subscriber identification module/user identity module (SIM/UIM) card socket, an audio input/output (I/O) terminal, a Video I/O terminal, and an earphone. The interface unit 170 may receive power or data from such an external device and provide the same to each internal component of the mobile communication terminal 100. Also, the interface unit 170 may transmit internal data of the mobile communication terminal 100 to the external device.

When the mobile communication terminal 100 is connected to an external cradle, the interface unit 170 may be used as a channel through which the connected cradle supplies power to the mobile communication terminal 100 or a channel through which a variety of command signals input to the cradle by a user are transferred to the mobile communication terminal 100.

The controller 180 generally controls the operation of each component to control the overall operation of the mobile communication terminal 100. For example, the controller 180 performs control and processing associated with voice communication, data communication, video communication, and the like. The controller 180 may include a multimedia playback module 181 for multimedia reproduction. The multimedia playback module 181 may be implemented as hardware in the controller 180 or may be implemented as software separately from the controller 180.

The power supply unit 190 is supplied with external power source or internal power source and supplies power source necessary for the operation of the each component under the control of the controller 180.

The mobile communication terminal 100 may be configured to be operable in a communication system, which transmits data through frames or packets, including a wired/wireless communication system and a satellite-based communication system.

Figure 3:
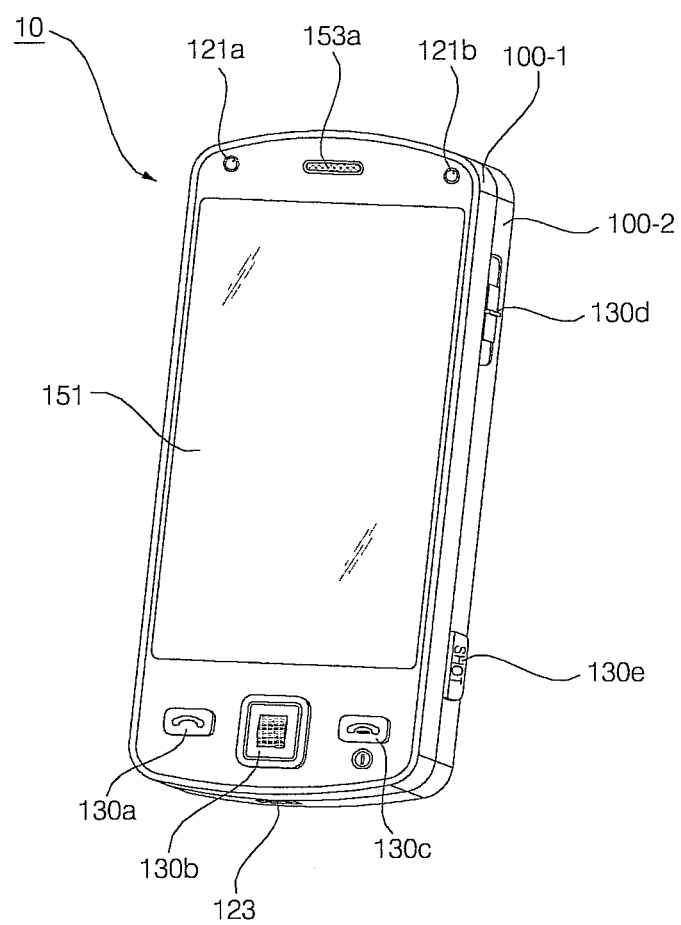
FIG. 3 is a front perspective view of the mobile communication terminal according to one exemplary embodiment of the present invention.
Figure 4:
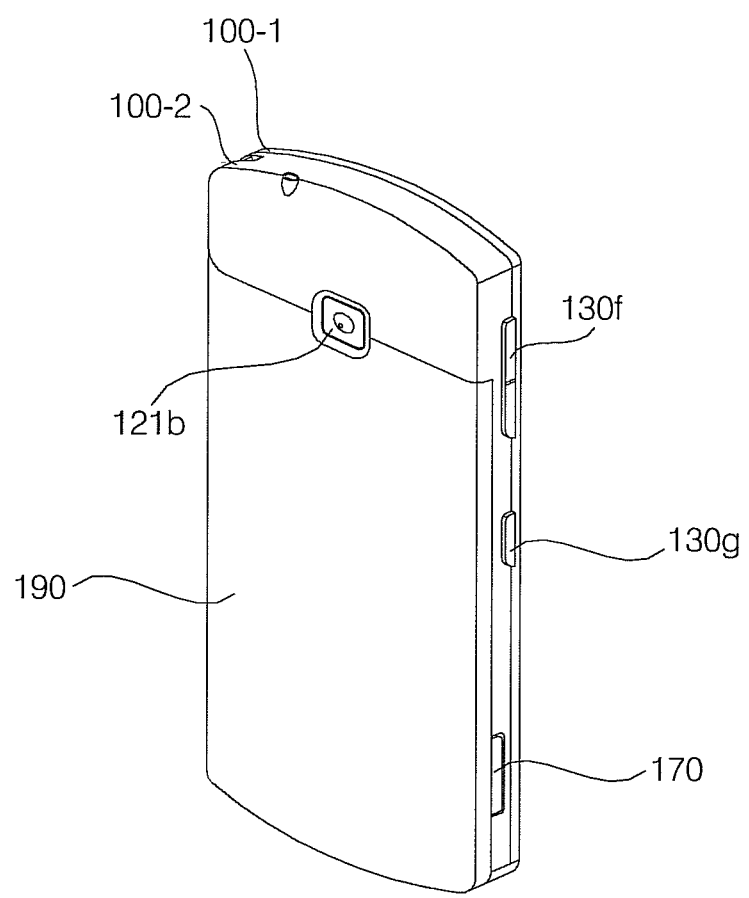
FIG. 4 is a rear perspective view of the mobile communication terminal shown in FIG. 3.

FIG. 3 is a front perspective view of the mobile communication terminal according to one exemplary embodiment of the present invention. FIG. 4 is a rear perspective view of the mobile communication terminal shown in FIG. 3. Referring to FIGS. 3 and 4, the mobile communication terminal according to the present invention will be described in the aspect of components according to outer appearances. Hereinafter, a bar type mobile communication terminal equipped with a full touch screen, of several types of mobile communication terminals such as a folding type, a bar type, a swing type, and a sliding type, is described as an example, for convenience of description. However, it should be understood that the present invention is not limited to the bar type mobile communication terminal, but instead may be applied to all types of mobile communication terminals, including the above types.

Referring to FIG. 3, a case constituting the external appearance of the mobile communication terminal 100 includes a front case 100-1 and a rear case 100-2. A variety of electronic parts are provided in a space defined within the front and rear cases 100-1 and 100-2. The front case 100-1 and the rear case 100-2 may be formed by synthetic resin injection molding, or may be formed from metal such as stainless steel (STS) or titanium (Ti).

The display unit 151, a first sound output module 153a, a first camera 121a, and first to third user input units 130a, 130b, and 130c may be further disposed in a main body, specifically, in the front case 100-1. A fourth user input unit 130d, a fifth user input unit 130e, and a microphone 123 may be further disposed on a side surface of the rear case 100-2.

A touch pad may be overlapped with the display unit 151 in a layered structure and, therefore, the display unit 151 operates as a touch screen, enabling the input of information by a user's touch.

The first sound output module 153a may be implemented in the form of a receiver or speaker. The first camera 121a may be implemented in a form suitable for capturing still images or motion images of a user, etc. Further, the microphone 123 may be implemented in a form suitable for receiving sound such as user voice.

Also, the first to fifth user input units 130a, 130b, 130c, 130d, and 130e and sixth and seventh user inputs unit 130f and 130g to be described later may be collectively referred to as the user input unit 130. The user input unit 130 may adopt any kind of a method as long as it is a tactile manner, which allows a user to manipulate the user input unit 130 while feeling a tactile sense.

For example, the user input unit 130 may be implemented using a dome switch or a touch pad, which is able to receive commands or information through a user's push or touch manipulation, or may be implemented using a wheel or jog method of rotating a key or a method using a joystick. In terms of functionality, the first to third user input units 130a, 130b, and 130c allow the user to input a command such as start, end, or scroll, and the fourth user input unit 130d allows the user to select an operating mode of the mobile communication terminal 100. The fifth user input unit 130e may function as a hot key for activating a special function of the mobile communication terminal 100.

Referring to FIG. 4, a second camera 121b may be additionally disposed on a rear face of the rear case 100-2, and the sixth and seventh user input units 130f and 130g and the interface unit 170 may be arranged on a side surface of the rear case 100-2.

Further, the second camera 121b may have a capture direction substantially opposite to that of the first camera 121a, and have different pixels from those of the first camera 121a. A flash (not shown) and a mirror (not shown) may be additionally disposed adjacent to the second camera 121b. Another camera may be further disposed near the second camera 121b to capture a three-dimensional stereoscopic image.

The flash illuminates light to a subject when the subject is photographed by the second camera 121b. The mirror 126 reflects a user's face, etc. when the user tries to have his picture taken (self-photographing) using the second camera 121b.

A second sound output module (not shown) may be further disposed in the rear case 100-2. The second sound output module may implement a stereo function together with the first sound output module 153a, and may also be used for a call in a speakerphone mode.

The interface unit 170 may be used as a link that allows data to be exchanged with an external device. An antenna (not shown) for reception of broadcast signals may be further disposed at one side of the front case 100-1 and the rear case 100-2, in addition to an antenna for calls. The broadcast signal reception antenna may be installed to be extractable from the rear case 100-2.

The power supply unit 190 may be mounted in the rear case 100-2 to supply power to the mobile communication terminal 100. The power supply unit 190 may be, for example, a rechargeable battery, which may be detachably mounted in the rear case 100-2 for charging, etc.

It has been described above that the second camera 121b, etc. are disposed in the rear case 100-2, but the present invention is not necessarily limited to the above arrangement. For example, although the second camera 121b is not separately included, the first camera 121a may be rotatably disposed in such a way as to photograph even in photographing directions of the second camera 121b.

Figure 5:
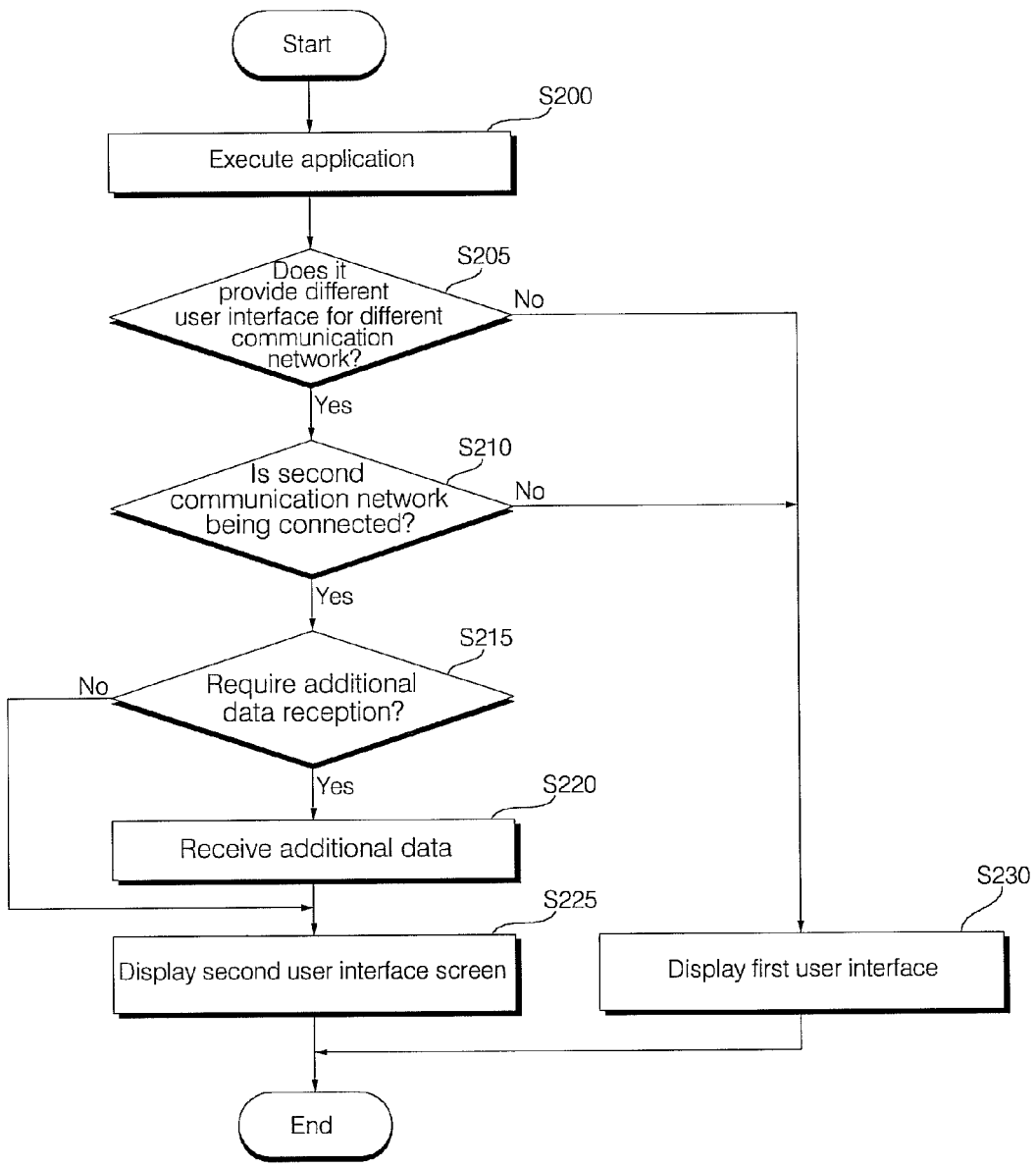
FIG. 5 is a flowchart showing an operation method of a mobile communication terminal according to another exemplary embodiment of the present invention.

FIG. 5 is a flowchart showing an operation method of a mobile communication terminal according to another exemplary embodiment of the present invention.

The mobile communication terminal according to the exemplary embodiment of the present invention is connectable to both a first communication network and a second communication network. The first communication network, which is a legacy network, can be exemplified as a 3G network, and the second communication network can be exemplified as an LTE network. The second communication network may be a network which is superior in data traffic, transfer rate, and communication quality to the first communication network. The mobile communication terminal 10 may be simultaneously connected to the first communication network and the second communication network, or may be sequentially connected thereto by handover.

When the mobile communication terminal 10 is simultaneously connected to the first communication network and the second communication network, it may be a terminal equipped with two or more antennas and capable of performing MIMO communication. That is, this exemplary embodiment may involve both making a connection to the second communication network after a connection to the first communication network and making a further connection to the second communication network during a connection to the first communication network.

The controller 180 executes one or more applications selected by a user signal (S200). Then, the controller 180 determines whether the selected applications provide different user interfaces for different communication networks (S205).

Even if the same application is executed, different user interface screens may be provided under the first and second communication networks. That is, under the first communication network with relatively low data transfer rate where it is difficult to transmit large-volume data, a user interface image can be configured using low volumes of data only. On the other hand, as long as the second communication network has a relatively high data transfer rate, and is advantageous for fast transmission of large volumes of data or offers data transmission at low charges, relatively large volumes of data can be received and used to configure a user interface screen under the second communication network. An application that provides different user interfaces for different communication networks is hereinafter referred to as an adaptive application.

The controller 180 identifies which communication network is currently connected (S210). If the mobile communication terminal is connected to the second communication network, the controller 180 generates a second user interface screen. In this case, the controller 180 determines whether there exists data to be additionally received to generate the second user interface screen in addition to data to be received to generate a first user interface screen (S215). For example, while still images are used to generate the first user interface screen, motion images are additionally used to generate the second user interface screen. The additional data used herein may be image data corresponding to motion images.

Once it is determined there is a need to receive additional data, the wireless communication unit 110 receives additional data via the second communication network (S220). Further, the controller 180 uses the received additional data to generate the second user interface screen and display it on the display unit 151 (S225). If there is no need to receive additional data to generate the second user interface screen, the second user interface screen can be generated without any additional data.

If the mobile communication terminal is not connected to the second communication network, or the same user interface screen is provided in every network because an executed application is not an adaptive application, the display unit 151 displays a default user interface screen or the first user interface screen (S230).

Figure 6:
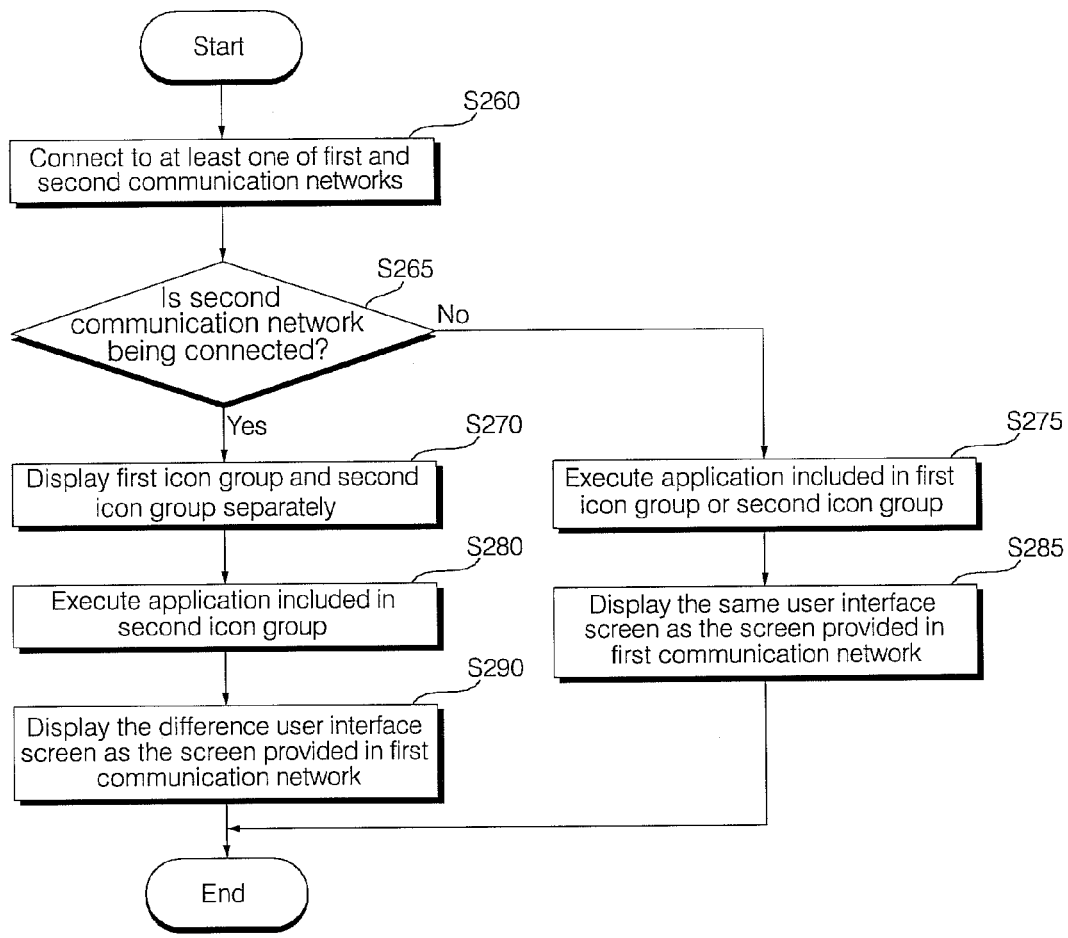
FIG. 6 is a flowchart showing an operation method of a mobile communication terminal according to still another exemplary embodiment of the present invention.

FIG. 6 is a flowchart showing an operation method of a mobile communication terminal according to still another exemplary embodiment of the present invention.

The mobile communication terminal is connected to at least one of a first communication network and a second communication network via a wireless communication unit 110 (S260). The controller 180 identifies which communication network is currently connected (S265). If the mobile communication terminal is connected to the second communication network, the controller 180 distinguishes a second icon group from a first icon group. Then, the display unit 151 displays the first icon group and the second icon group in a distinguishable manner, such as displaying them separately in different areas or rendering them with different visual effects (S270).

When there is no connection to the second communication network, the process of separately displaying the first icon group and the second icon group can be omitted. In other exemplary embodiments, of course, the first icon group and the second icon group are separately displayed even when the mobile communication terminal is connected only to the first communication network, and the first icon group may be displayed at the front part of an icon list. However, when the mobile communication terminal is connected to the first communication network, different user interface screens according to an exemplary embodiment of the present invention cannot be provided no matter from which group an icon is selected to execute the application.

When the mobile communication terminal is not connected to the second communication network, at least one selected from the applications included in the first icon group or second icon group is executed (S275). A user interface screen displayed in the first communication network, that is, a first user interface screen or a default user interface screen, may be displayed on the display unit 151 (S285).

When the mobile communication terminal is connected to the second communication network, one icon can be selected from the second icon group, displayed separately from the first icon group. An application corresponding to the second icon group may be an adaptive application. Accordingly, different user interfaces screens may be provided for the first communication network and the second communication network, respectively. In other words, while the first user interface screen may be displayed when the mobile communication terminal is connected to the first communication network, the second user interface screen, different from the first user interface screen, may be displayed when the mobile communication terminal is connected to the second communication network. If one icon is selected from the second icon group, the controller 180 executes the corresponding application (S280). The controller 180 generates the second user interface screen using data received via the second communication network, and the display unit 151 displays the generated screen (S290).

Likewise, when the mobile communication terminal is connected to the second communication network, if an icon is selected from the first icon group, only the first user interface screen is provided.

Figure 7:
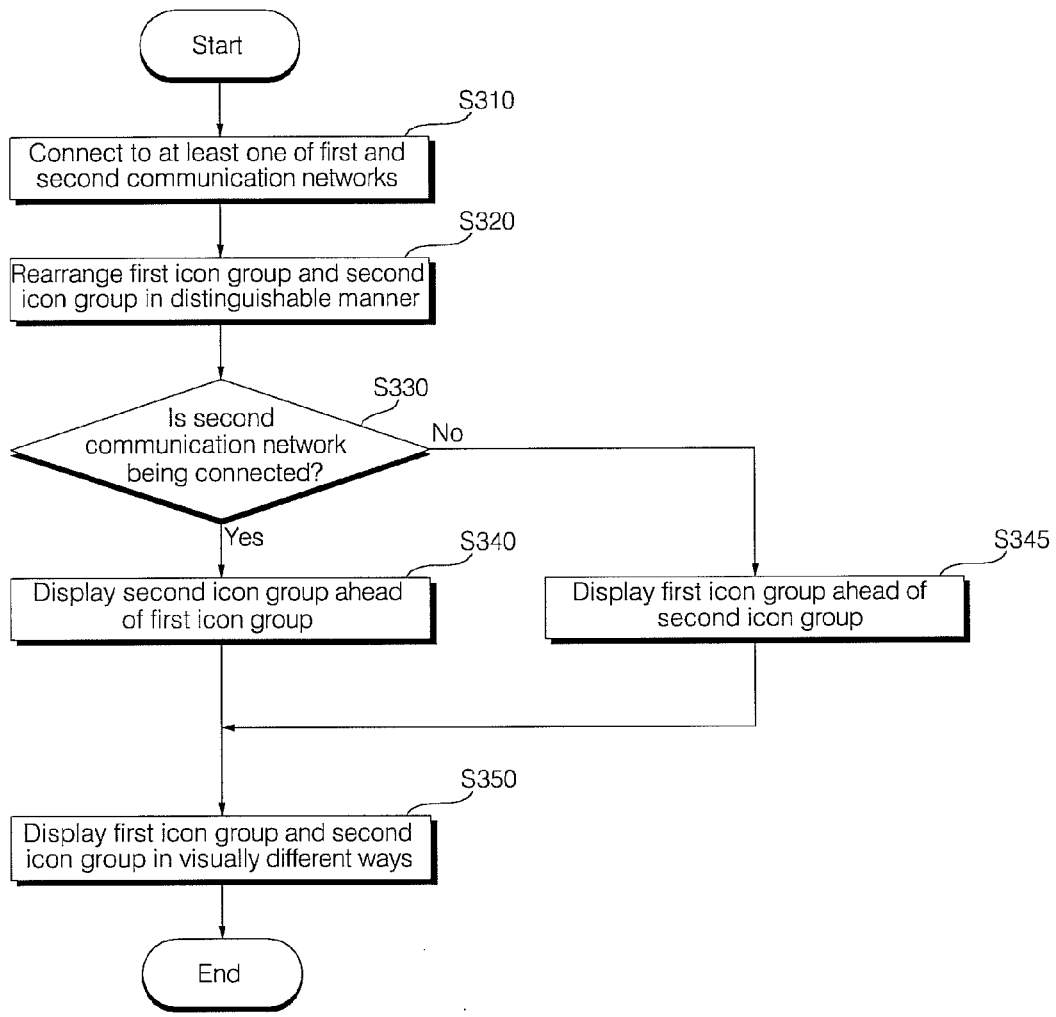
FIG. 7 is a flowchart showing an operation method of a mobile communication terminal according to an exemplary embodiment of the present invention.

FIG. 7 is a flowchart showing an operation method of a mobile communication terminal according to an exemplary embodiment of the present invention.

The mobile communication terminal is connected to at least one of the first communication network and the second communication network (S310). The controller 180 can rearrange the first icon group and the second icon group in a distinguishable manner (S320). The first icon group may include icons for applications having priority in the first communication network, and the second icon group may include icons for applications having priority in the second communication network.

Having priority means that it may be more advantageous or desirable to execute an application under a particular communication network according to the attributes or user settings of the application. For example, in the case that a user has previously set up applications to be preferentially executed when changing to a different network, the preset applications may be given priority. Alternatively, in the case that the data transfer rate required to execute an application is not covered by the first communication network, the corresponding application may have priority for the second communication network. Alternatively, an application that charges high fees for data transfer when executed has priority for a communication network that charges relatively low fees for data transfer. According to the above criteria, priorities for each communication network can be established, and the first icon group and the second icon group can be distinguished.

Therefore, according to an exemplary embodiment of the present invention, an application capable of providing much more information through a differentiated user interface screen when executed in the second communication network, as compared to when executed in the first communication network, may be included in the second icon group having priority for the second communication network.

To rearrange the icon groups, it is identified which communication network is currently connected (S330). When the mobile communication terminal is connected to the second communication network, the display unit 151 displays the second icon group ahead of the first icon group (S340). Likewise, when both of the first communication network and the second communication network are connected, the second icon group may be displayed at the front part of the icon group based on the fact that the mobile communication terminal is connected to the second communication network.

When the mobile communication terminal is not connected to the second communication network, that is, only a connection to the first communication network is detected, the first icon group is displayed ahead of the second icon group (S345). The first icon group and the second icon group may be displayed in visually different ways (S350). For example, as described above, the first icon group and the second icon group may have different display areas in the screen. The first icon group may be displayed at the front part of the icon list under the first communication network, while the second icon group may be displayed at the front part of the icon list under the second communication network. Alternatively, the first icons and the second icons may be differently displayed by using icon brightness, sharpness, size, and other highlighting effect.

FIGS. 8 to 12 are views illustrating a method for displaying icons on a mobile communication terminal according to an exemplary embodiment of the present invention.

The mobile communication terminal may be connected to a first communication network, a second communication network, and/or a third communication network. The first communication network may be exemplified as a 3G network, the second communication network as an LTE network, and the third communication network as a WiFi network. As the mobile communication terminal is connected to the first communication network, second communication network, or third communication network, a first icon group, a second icon group, and a third icon group are separately displayed.

Figure 8:
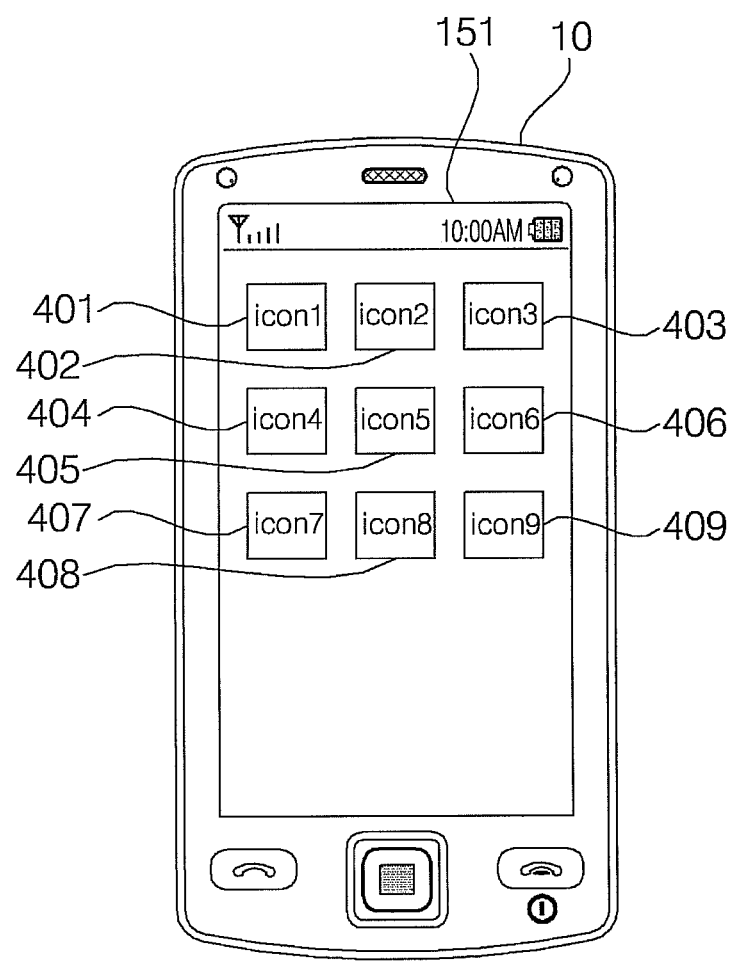

FIG. 8 illustrates a display state of the icon list when the mobile communication terminal is connected to the first communication network. A first icon 401, a second icon 402, a third icon 403, a fourth icon 405, a fifth icon 405, a sixth icon 406, a seventh icon 407, an eighth 408, and a ninth icon 409 are displayed, and the icons correspond to different applications.

Figure 9:
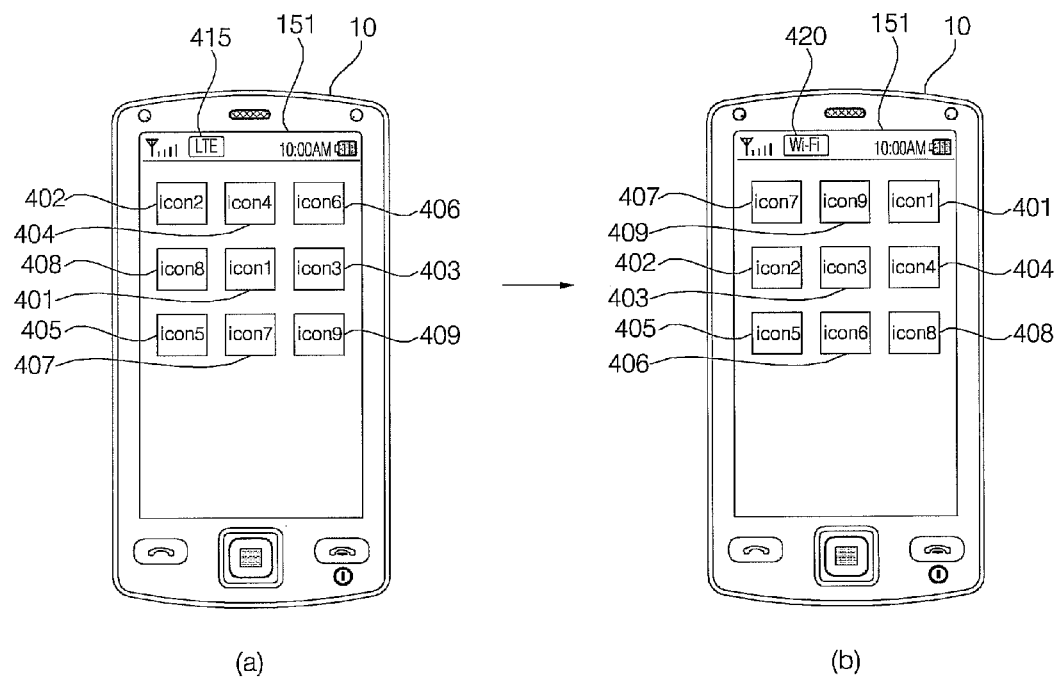

FIG. 9 illustrates the icon list when the mobile communication terminal is connected to the second communication network or third communication network. FIG. 9(a) illustrates the second icon group displayed at the front part of the icon list when the mobile communication terminal is connected to the second communication network. FIG. 9(b) illustrates the third icon group displayed at the front part of the icon list when the mobile communication terminal is connected to the third communication network. As illustrated in FIG. 9, the second icon group includes the second icon 402, the fourth icon 404, the sixth icon 406, and the eighth icon 408. The third icon group includes the seventh icon 407 and the ninth icon 409.

In the exemplary embodiment shown in FIG. 10, different icon groups are displayed in different areas depending on the type of connected communication network. Referring to FIG. 10(a), a 3G indicator 430 is displayed when the mobile communication terminal is connected to the first communication network. The first icon 401, the third icon 403, and the fifth icon 405 are displayed in a first area 440 of the display unit 151. The other icons are displayed in a second area 450 of the display unit 151.

Referring to FIG. 10(b), an LTE indicator 410 is displayed when the mobile communication terminal is connected to the second communication network. The second icon 402, the fourth icon 404, the sixth icon 406, and the eighth icon 408 are displayed in the first area 440 of the display unit 151. The other icons are displayed in the second area 450 of the display unit 151.

Likewise, referring to FIG. 10(c), a WiFi indicator 420 is displayed when the mobile communication terminal is connected to the third communication network. The seventh icon 407 and the ninth icon 409 included in the third icon group are displayed in the first area 440 of the display unit 151. The other icons are displayed in the second area 450 of the display unit 151.

Referring to FIG. 11, visual effects added to the icons depending on the type of communication network when the connected communication network is changed will be illustrated.

FIG. 11(a) illustrates a change in the boldness of the icons corresponding to applications having priority. FIG. 11(b) illustrates a variation in the size of the icons, and FIG. 11(c) illustrates a variation in the sharpness of the icons. The mobile communication terminal illustrated in FIG. 11 is assumed to be connected to the second communication network, that is, an LTE network. Along with the visual effects added to the icons included in the second icon group, the LTE indicator 410 is displayed at the top edge of the display unit 151. This allows the user to perceive that the second communication is currently connected.

Figure 12:
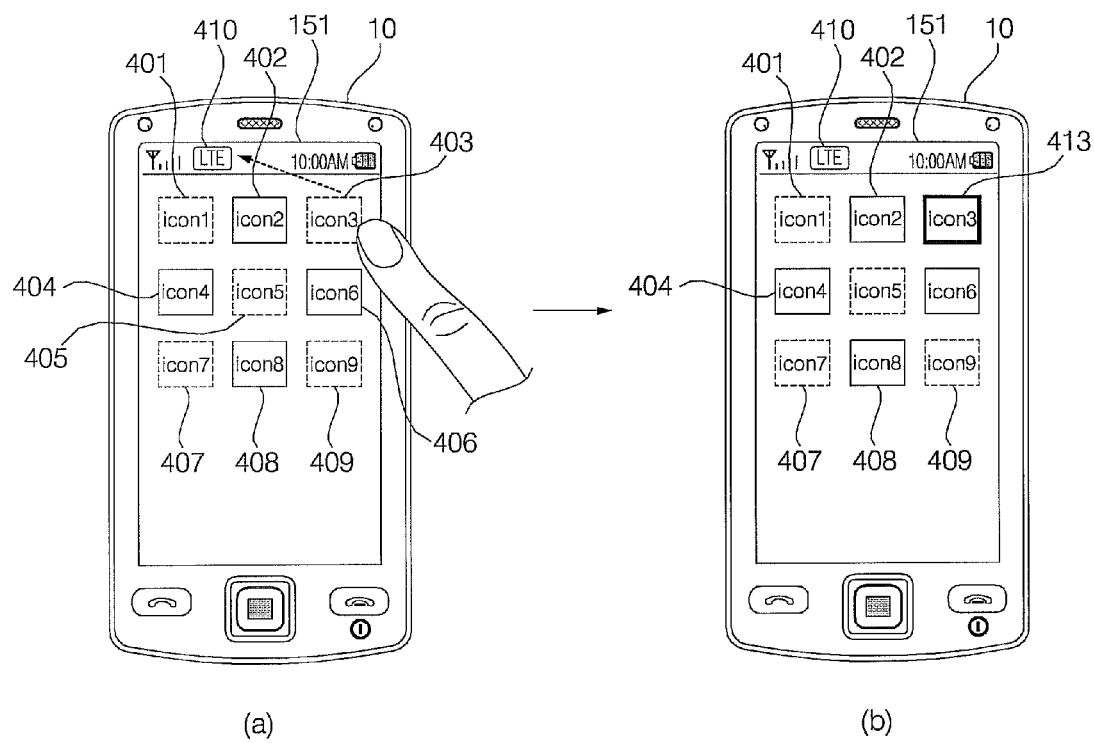

FIG. 12 illustrates a method of receiving a recommended application, which is an application having no priority for the current communication network, or getting information about this application.

The mobile communication terminal illustrated in FIG. 12 is currently connected to the LTE network, which is the second communication network. The third icon 403 is included in the first icon group, and the application corresponding to the third icon 403 has no priority for the second communication network. In other words, the application corresponding to the third icon 403 may not be suitable to be executed in the second communication network, or may be an application that cannot be executed in the second communication network.

In this case, by dragging the dimmed third icon 403 to the LTE indicator 410, the mobile communication terminal may receive and display a recommendation of another application having a similar function to the application corresponding to the third icon 403, or may download the application according to the recommendation.

If a new application corresponding to the third icon 403 is received and stored in the memory 160, a new icon 413 substituted for the third icon 403 may be generated and displayed.

FIGS. 13 to 25 are views illustrating different screens displayed on the mobile communication terminal depending on the type of communication network when a variety of applications are executed according to an exemplary embodiment of the present invention.

FIG. 13 illustrates one example of a user interface screen for a communication network when a phonebook is executed. The phonebook application, as used herein, may provide a user interface that collectively displays photos 510 and names and contacts 520 of other users. Also, the phonebook application, which is an adaptive application in an exemplary embodiment of the present invention, provides different user interface screens for different communication networks.

FIG. 13(a) illustrates the first user interface screen provided by the phonebook application when the mobile communication terminal is connected to the first communication network.

On the first user interface screen, the photos 510 of the users provided by the phonebook application, pre-stored in the memory 160 of the mobile communication terminal, may be registered photos for use in the phonebook.

When the mobile communication terminal is connected to the second communication network, the wireless communication unit 110 of the mobile communication terminal may be connected to web pages registered for those other users upon execution of the phonebook application. Also, recent updates posted by those other users or a part of the posts are downloaded from the servers of those web pages. Moreover, the display unit may further display updates 530, together with the contacts 520, on the user interface screen for the phonebook application.

In addition, when displaying the photos 510 of those other users, photos uploaded to the web pages by those other users, instead of the photos stored in the memory 160, may be received and displayed together with their contacts 520.

In this case, upon execution of the phonebook application, updates of the web pages run by those other users, recent posts and comments, news, etc, appear at once, along with the contacts.

FIGS. 14 to 20 illustrate the screen which differs depending on the type or status of a communication network upon execution of a map application.

FIGS. 14 to 17 illustrated map images showing different views at different altitudes upon execution of the map application. The adaptive application executed with reference to FIGS. 14 to 17 is a map application. If an adaptive map application is executed in the second communication network, a map with varying views can be displayed.

Figure 14:
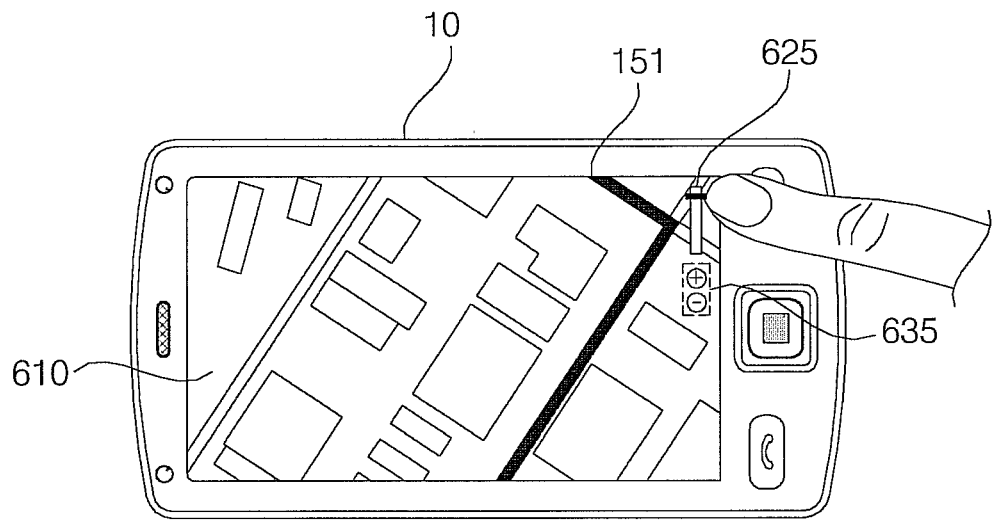

In general, when the map application is executed, a map as shown in FIG. 14 is displayed. The map displayed in FIG. 14 is displayed as a view of a certain region from an altitude of 90°. However, because a large amount of data is received when the mobile communication terminal is connected to the second communication network, map images with varying views can be received and displayed.

Figure 15:
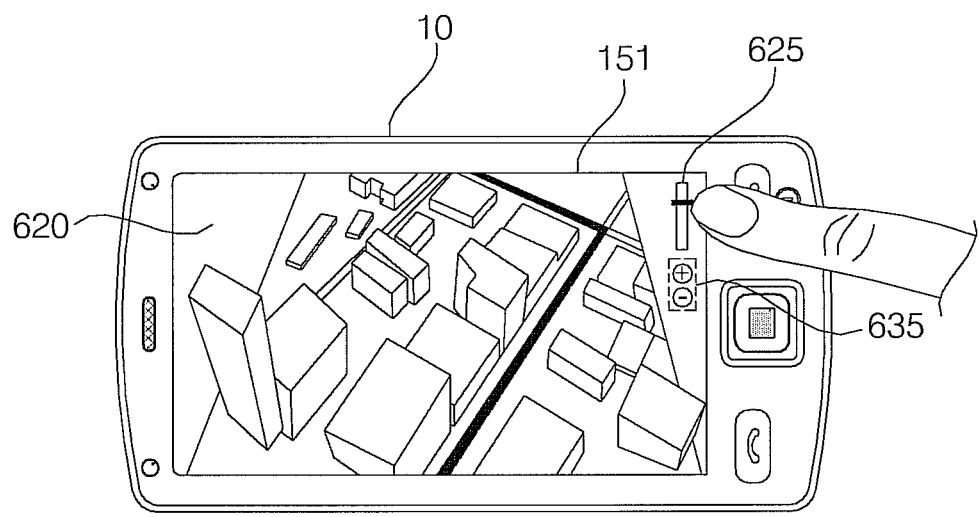
Figure 16:
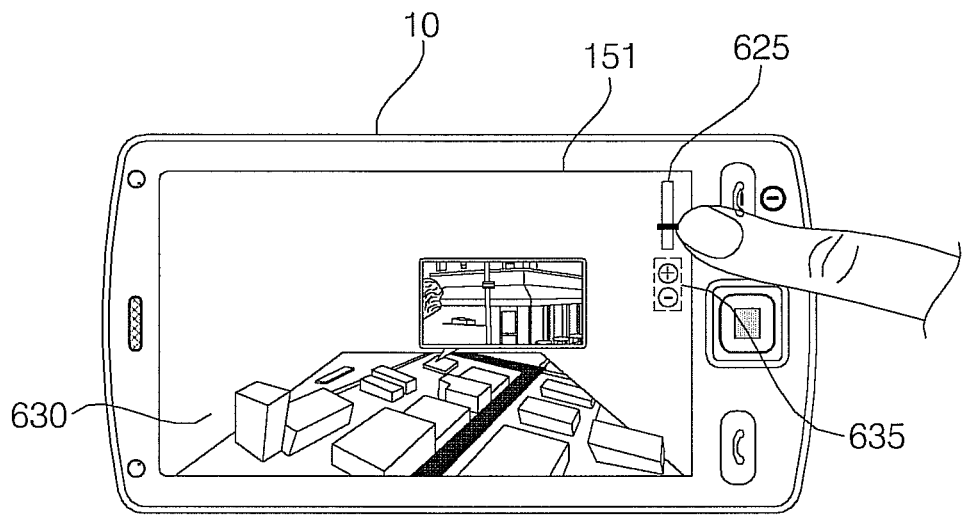
Figure 17:
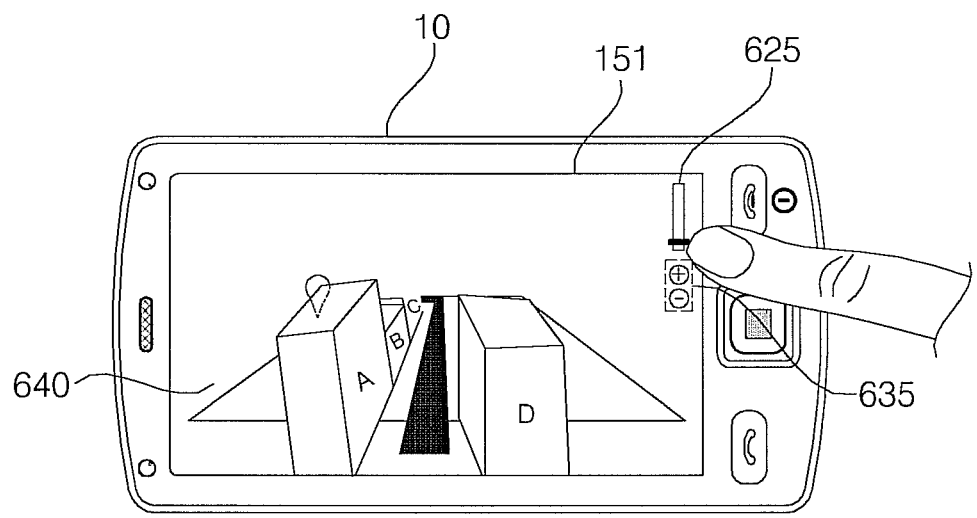

FIG. 14 illustrates a first map image 610, FIG. 15 illustrates a second map image 620, FIG. 16 illustrates a third map image 630, and FIG. 17 illustrates a fourth map image 640. A map image of a particular region as viewed from an altitude of 90° can be referred to as the first map image 610, a map image of the particular region as viewed from an altitude of 60° can be referred to as the second map image 620, a map image of the particular region as viewed from an altitude of 30° can be referred to as the third map image 630, and a map image of the particular region as viewed from an altitude of 0° can be referred to as the fourth map image 640. The fourth map image 640 may be an image referred to as a so-called "road view".

First of all, when the map application is executed, the user input unit 130 of the mobile communication terminal receives a user input signal designating a region from the user. While a map of the designated region is being displayed, an Altitude Select bar 625 can be displayed as well. The user can adjust the altitude by touching the Altitude Select bar 625. For example, the altitude can be adjusted and selected based on the trajectory of a user's touch input. By altitude adjustment, the map is displayed in varying views. Displaying of a map in varying views may involve displaying a map in road view, bird view, or sky view depending on the altitude looking down at the earth. As the altitude set in the Altitude Select bar 625 becomes lower, the altitude at which the displayed map is viewed becomes lower.

Moreover, a map image at a particular altitude can be zoomed in or out using a Zoom In/Out button 635. The controller 180 can zoom in or out the map image in response to a user signal input through the Zoom In/Out button 635 and display it on the display unit 151.

In response to an eye level selection signal input through the Altitude Select bar 625 by the user, the wireless communication unit 110 receives map images of various views. The controller 180 processes data of the map images by varying the view of the map in response to the eye level selection signal, and the display unit 151 displays the map images while continuously changing the altitude.

Figure 18:
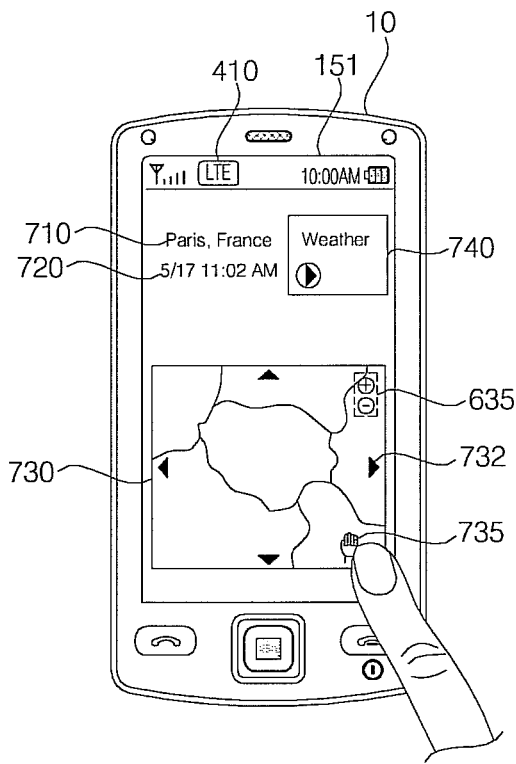
Figure 19:
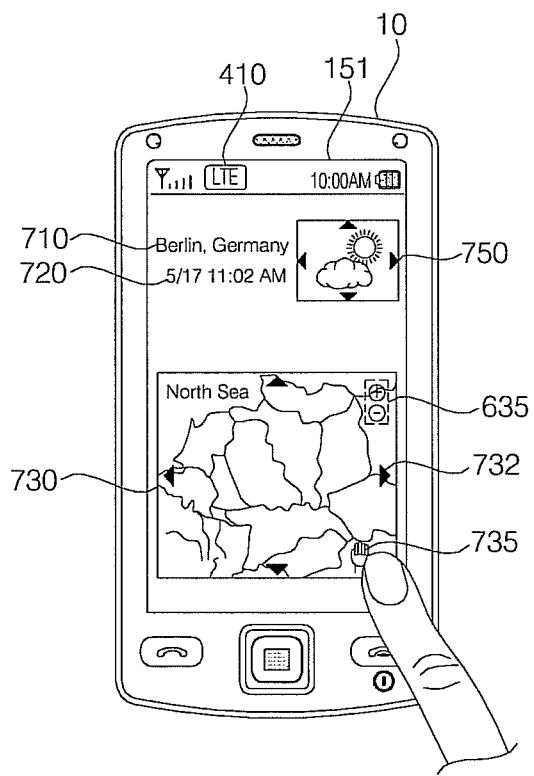
Figure 20:
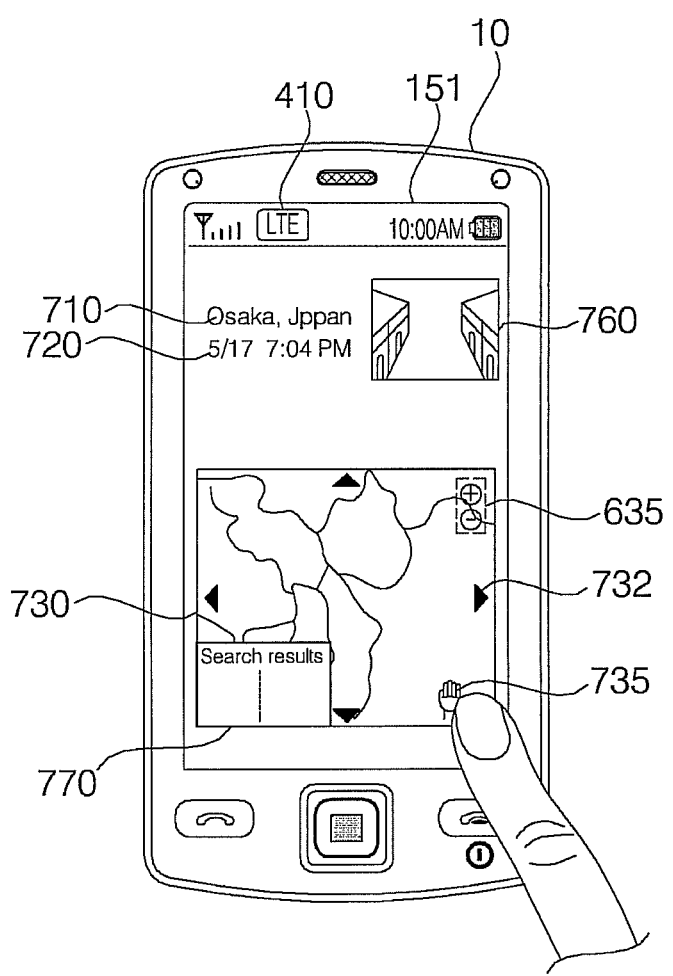

FIGS. 18 to 20 illustrate an application that provides a variety of regional information in addition to maps.

The adaptive application illustrated in FIGS. 18 to 20 is a regional information search application. The regional information search application may be an application that searches and provides regional information on a specific region. The regional information may include maps of the corresponding region, weather information, current time, sightseeing information, addresses, transportation information, and other geographical information. For example, famous restaurants, gas stations, a variety of stores, amenities, current traffic conditions, etc. may be included in the regional information or geographical information.

First of all, upon execution of the regional information search application, the user enters a user input signal for setting up a target region. For example, for displaying a map of a certain region on the display unit 151, the region currently displayed in any part or the entire part of the display unit 151 may be automatically set up as the target region.

The user may move the map up, down, left, and right by using a cursor 735. The user may enter a positioning signal. The target region is changed in response to the positioning signal, and map images are also variably displayed. Although images of the target region are exemplified as map images, the images of the target region are not limited thereto but may include satellite photographs, road view images, etc.

As the location of the region indicated on the map is shifted, the region on the map displayed by the display unit 151 may be continuously changed. The positioning signal may be input by selecting an arrow 732 indicated on the map image 730, or may be input according to the direction of a user's touch, the trajectory of the user's touch, and so on. Moreover, as the point at which the user's touch is input is shifted on the screen displaying the map image, the location or region indicated by the positioning signal may be continuously shifted.

That is, the target region can be continuously shifted in response to the positioning signal. When the target region is shifted, the wireless communication unit 110 continuously receives and updates information on a new target region. Therefore, regional information of the region currently indicated on the map can be displayed on the display unit 151.

As illustrated in FIG. 18, the regional information may include a regional name 710 of the target region, current time information 720 of the target region, a map image 730 of the target region, and video 740 related to the target region. The target region-related video 730 may include, for example, weather forecast video for the corresponding region, promotion video, news video, etc.

As illustrated in FIG. 19, the regional information may include a regional name 710 of the target region, current time information 720 of the target region, a map image 730 of the target region, and an image 740 representing weather information 750. In particular, the weather information 750 may be weather-related information which has been found for the region set as the target region and currently displayed in a map image on the display unit 151. When the user moves the map up, down, left, and right using the cursor 735, the target region is changed in real time. Therefore, the weather information 750 illustrated in FIG. 19 may be changed in real time, corresponding to motions on the map.

That is, as the region image is variably displayed in response to the positioning signal, the controller 180 also displays regional information on the target area in a continuously variable manner through the display unit 151.

Referring to FIG. 20, a road view image 760, as real-time regional information, is displayed along with the map image 730. In this case, the map image 730 and the road view image 760 show the same spot. When the user enters a positioning signal through either one of the map image 730 and the road view image 760, the location of the spot displayed by the other one may also be shifted. Moreover, additional geographic information on the corresponding target area may be provided, in addition, to the map image 730, through a regional information display screen 770. The regional information display screen 770 may be an internet window or user interface image that provides web search results on geographic information of a specific region.

Figure 21:
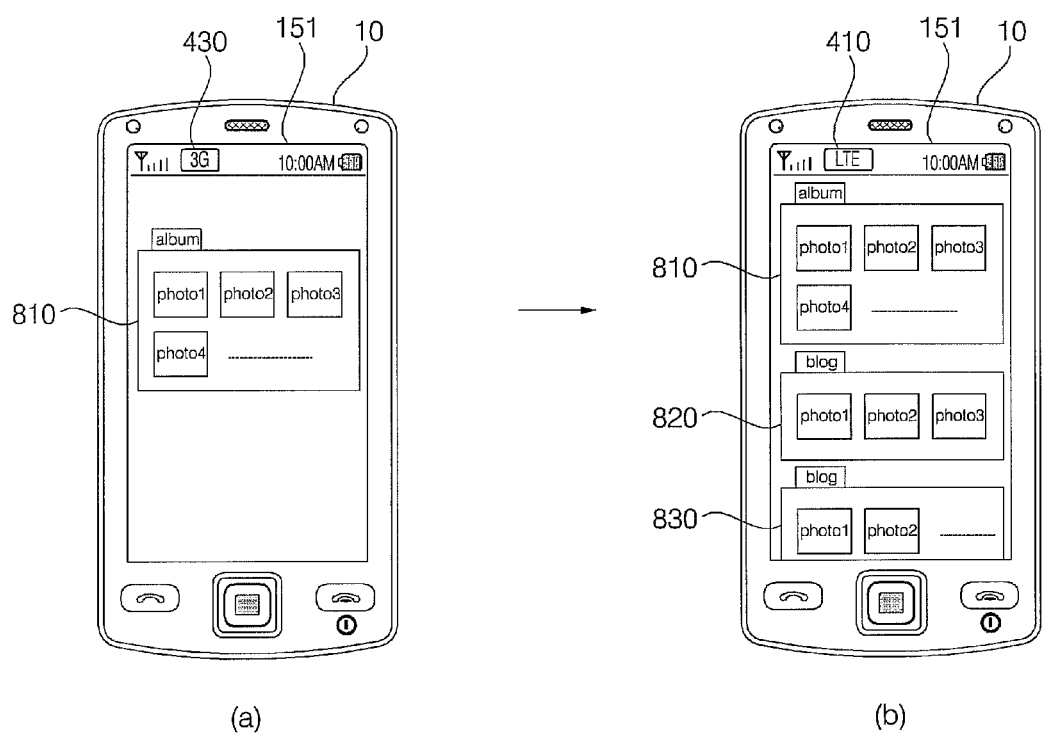

FIG. 21 illustrates a screen displaying both images stored in the mobile communication terminal and uploaded images, upon execution of an application for viewing images, depending on the type of communication network.

An adaptive application described with reference to FIG. 21 is an application displaying a list of images. Upon execution of an adaptive image list display application, if the mobile communication terminal is connected to the first communication network, the controller 180 generates a first user interface screen displaying a list of images stored in the mobile communication terminal. On the other hand, if the mobile communication terminal is connected to the second communication network, the user of the mobile communication terminal connects to a predetermined web page through the wireless communication unit 110. Then, the images uploaded to the web page are displayed together with the images stored in the mobile communication terminal. In this case, the part of the web page where the images have been uploaded may be displayed as it is, or the uploaded images may be received, stored in the memory 160, and displayed together with the pre-stored images.

Moreover, in the case that the user has previously set up two or more web pages, the user can simultaneously connect to the two or more web pages and display the uploaded images collectively for each type of the web pages.

Upon execution of the adaptive image list display application, for example, a pre-stored image list 810, a blog's uploaded image list 820, and a community site's uploaded image list 830 can be displayed on a single screen.

FIG. 22 illustrates an application that receives and provides a background screen based on a set keyword when the mobile communication terminal is connected to the second communication network.

In an exemplary embodiment described with reference to FIG. 22, the adaptive application may be an application for setting up a background screen of the mobile communication terminal. Upon execution of the adaptive background screen setup application in the first communication network, the user may set up the background screen of the display unit 151 of the mobile communication terminal 10. The background screen may be an image displayed as a default in the mobile communication terminal.

Upon execution of the adaptive background screen setup application in the second communication network, the user may enter a keyword as illustrated in FIG. 22(a). The keyword may be input into a search window 900 for a specific search engine using a keyboard 910. Based on the keyword, the controller 180 may control the wireless communication unit 110 to search and receive an image corresponding to the keyword via the second communication network.

Referring to FIG. 22(b), an image received as a result of searching, along with the search screen 920, is registered as the background screen. The background screen may be displayed simultaneously with the other icons 401, 402, 403, and 404 or the running search screen 920. In other words, the background screen may be automatically received and registered even if there is any other application running.

Referring to FIG. 22(c), the background screen registration application according to an exemplary embodiment of the present invention may be executed to search and register a background screen image while other application is running. For example, in the case that an application 930 providing weather information is executed, if the mobile communication terminal is connected to the second communication network, the user may search, receive, and store an image to be registered as the background screen using a previously input keyword, and register or change the background screen.

FIG. 23 illustrates an application that provides a hyperlink function or instant search function when the mobile communication terminal is connected to the second communication network when a text file is opened.

That is, the adaptive application illustrated in FIG. 23 is an application that generates and displays a text file. In this case, URL address information and web search results, which are associated with words and phrases included in the text file, may be provided as well on the second user interface screen.

For example, in the case that the user has generated and stored a text file using the memo function of the mobile communication terminal, if the controller 180 executes the corresponding application in the first communication network, only the text file is displayed on the display unit 151, as illustrated in FIG. 23(a).

In contrast, if the controller 180 executes the application in the second communication network, a particular phrase in the text file, provided along with its related URL information, may be hyperlinked. FIG. 23(b) illustrates an example in which a first item 1011, a second item 1013, and a third item 1015 in the memo are hyperlinked. Moreover, the instant search function works on the third item 1015. As soon as the third item 1015 is generated, a web search box 1020 for this may be displayed, and a web search for related information may be executed.

FIG. 23(c) illustrates that more in-depth information is searchable. In other words, if the user requests additional information about the third item 1015 and the fourth item 1017, additional information containing a large volume of data on each item can be displayed as a first sub-screen 1030 and a second sub screen 1040.

In particular, when a map image is displayed through the first sub-screen 1030, information on the surrounding area is also available. Also, when a calendar is displayed through the second sub-screen 1040, screening information by date, a screening schedule for films, etc. can be displayed. For example, if the third item 1015 corresponding to the second sub-screen 1040 is a movie theater, screening information by date, a screening schedule for films, available seat information, etc. can be displayed along with the calendar. To this end, the controller 180 can search information on the movie theater of the third item 1015, and receive related information via the second communication network.

Figure 24:
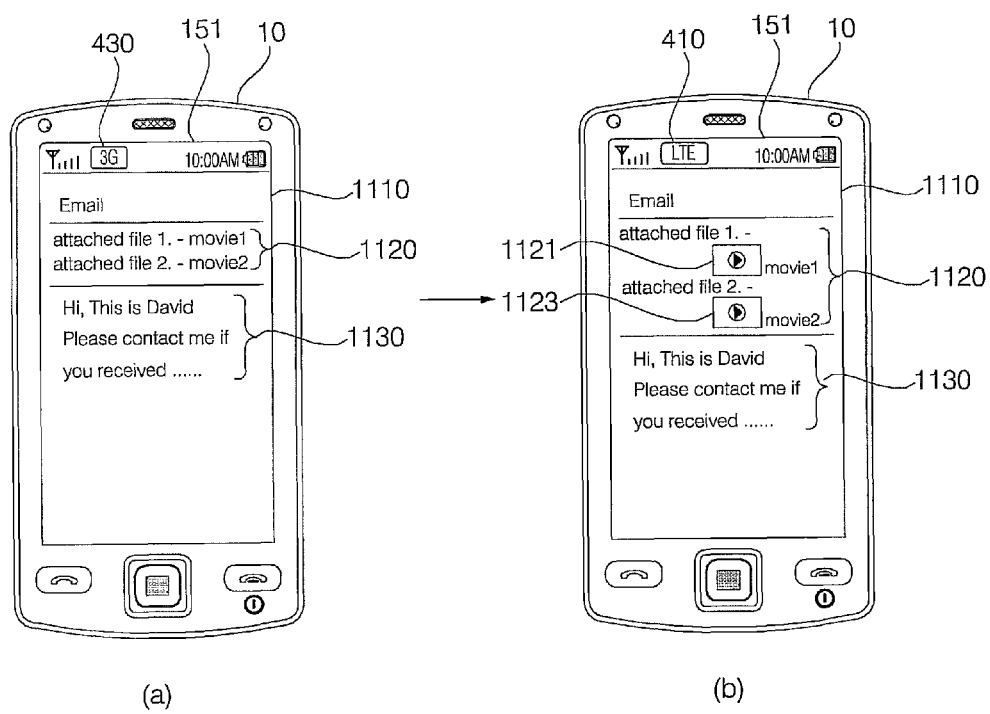

FIG. 24 illustrates a screen which provides a preview image of files attached to email when the mobile communication terminal is connected to the second communication network. Referring to FIG. 24, an exemplary embodiment will be described in which a display state of the attached files is changed upon execution of an email application when the mobile communication terminal is connected to the second communication network.

The adaptive application illustrated in FIG. 24 is an email application. The user can write and send email or check incoming email through an email execution window 1110 displayed through the email application.

Various kinds of files can be attached to email. When the mobile communication terminal is connected to the second communication network, a relatively larger volume of files can be attached, as compared to when the mobile communication terminal is connected to the first communication network. Particularly, when the second user interface screen is provided, a large volume of files attached to incoming email can be previewed. Also, the user can be provided with a preview image of attached files after attaching the files to outgoing mail.

When the email execution window 1110 is displayed in the first communication network, an attached film list 1120 is displayed in a part of the email execution window 1110, preview images 1121 and 1123 of attached files are displayed on the attached file list. In particular, the attached files are video files. Part of the videos can be played in the preview images 1121 and 1123.

Particularly for a video attached to incoming email, the controller 180 can play any or all parts of the corresponding video in a streaming format using the preview function before downloading the entire video and storing it in the memory. In this case, the video displayed using the preview function may have a smaller volume than the volume of the original attached file, or may not contain an audio file.

FIG. 25 illustrates a screen which provides additional information upon execution of an application with a music search function when the mobile communication terminal is connected to the second communication network.

The adaptive application according to an exemplary embodiment described with reference to FIG. 25 is an application that provides a music file list.

Through the first user interface screen, a list 1130 of music files stored in the memory 160 or received by web search is displayed. However, when the mobile communication terminal is connected to the second communication network, upon execution of the application that provides a music file list, music files and videos related to these music files are searched and received. Moreover, related videos are displayed along with the list of the music files. For example, the videos related to these music pieces may include music videos of the music pieces, interview videos of the artists, related movies, etc.

Referring to FIG. 25(a), when the mobile communication terminal is connected to the first communication network, if the user searches music by an artist name through a music search window 1210, a music list 1130 related to the artist is displayed. As illustrated in FIG. 25(a), a user interface screen including only the music list 1130 on the display unit 151 may be a first user interface.

Referring to FIG. 25(b), when the mobile communication terminal is connected to the second communication network, if the user searches music by an artist name through the music search window 1210, related videos, along with the music list 1130, are searched, and thumbnail images 120 of the videos are displayed, along with the music list 1130, on the second user interface screen 1220.

When the mobile communication terminal is connected to the second communication network, large-volume data can be transmitted, and video buffering can be done quickly, thus offering an advantage in the searching, reception, and playback of video files. Although the music list 1130 is exemplified as set forth above, an exemplary embodiment of the present invention may likewise apply to a list of files of different types. In other words, in the case that the mobile communication terminal provides a basic list consisting of given files, when the mobile communication terminal is connected to the second communication network, related information containing a larger volume of data than the files included in the basic list is searched, received, and displayed along with the list, thereby providing more diverse information to the user.

As described above, a mobile communication terminal and an operation method thereof according to an exemplary embodiment of the present invention are not limited to the configuration and method of the exemplary embodiments described as above, but the exemplary embodiments may be configured by selectively combining all the embodiments or some of the exemplary embodiments so that various modifications can be made.

As described above, the mobile communication terminal and the operation method thereof according to the present invention are not limited to the configurations and methods of the above-described exemplary embodiments, but all or some of the respective embodiments may be selectively combined and executed so that various modifications can be made within the scope of the invention as claimed.

Meanwhile, this invention can be implemented in processor-readable codes in a processor-readable recording medium provided on the mobile communication terminal. Here, the processor-readable recording medium includes all kinds of recording devices for storing processor-readable data. Examples of the processor-readable recording medium include a computer-readable storage medium such as ROM, RAM, CD-ROMs, magnetic tapes, a hard disk, floppy disks, and optical data storage devices, and a means implemented in the form of carrier waves, for example, transmission via Internet. The processor-readable recording medium may be distributed among computer systems connected to a network, and processor-readable codes may be stored and executed in a decentralized fashion.

Further, in the present specification, although the preferred embodiments of the present invention have been shown and described, the present invention is not limited to the above-described specific embodiments, those skilled in the art will appreciate that various modifications are possible in the art, without departing from the gist of the invention as disclosed in the accompanying claims, and such modifications should not be understood separately from the technical spirit or scope of the present invention.

Accordingly, it is an object of the present invention to provide a mobile communication terminal, which provides different user interfaces for different communication networks, and an operation method thereof.

In order to achieve the aforementioned object, there is provided an operation method of a mobile communication terminal according to an exemplary embodiment of the present invention, wherein the mobile communication terminal is connectable to a first communication network and a second communication network, the method including: connecting to at least one of the first and second communication networks; executing an application; determining whether the executed application is an adaptive application that provides a different user interface screen for each communication network; upon execution of the adaptive application, generating a second user interface screen corresponding to the second communication network if the mobile communication terminal is connected to the second communication network, and generating a first user interface screen corresponding to the first communication network if the mobile communication terminal is not connected to the second communication network; and displaying either the first user interface screen or the second user interface screen.

According to the present invention, two users can make a video call while looking on the same screen by sharing content between two terminals during the video call. Moreover, they can share the same screen by freely sending and receiving large volumes of content. If they want to share a widget but any of the two terminals does not have the widget, they can download the widget according to user selections. Further, even when the users share the same content, they can see different images from each other by account. A screen where one party has logged on with its account may be temporarily provided to the other party. In addition, once the users share content or a widget, they can easily control the terminals, such as enlarging the display screen appearing upon execution of the content or widget, by switching over between the content or widget and the video call window.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of a mobile communication terminal connectable to a first communication network and a second communication network, the method comprising:
connecting to at least one of the first communication network or the second communication network; and
rearranging a first icon group and a second icon group in a distinguishable manner according to a type of the connected communication network,
wherein the rearranging the first and second icon groups comprises:
determining that the mobile communication terminal is connected to the second communication network;
displaying, on a screen of a display unit, the second icon group ahead of the first icon group in response to the determination that the mobile communication terminal is connected to the second communication network; and
displaying, on the screen of the display unit, the first icon group ahead of the second icon group in response to the determination that the mobile communication terminal is not connected to the second communication network,
wherein a plurality of icons included in the second icon group correspond to a plurality of adaptive applications that allow the mobile communication terminal to display either a first user interface screen or a second user interface screen depending on the connected communication network.

2. The method of claim 1, wherein the second communication network has a greater data transfer rate than the first communication network.

3. The method of claim 1, wherein the first icon group includes a plurality of icons corresponding to a plurality of applications that have a priority in the first communication network, and the second icon group includes the plurality of icons corresponding to the plurality of applications that have a priority in the second communication network.

4. The method of claim 1, wherein the adaptive application has two modes, and an appropriate mode of the two modes is run based on the determined communication network.

5. The method of claim 1, further comprising:
displaying the second user interface screen in response to an execution of an application corresponding to an icon selected from the second icon group when the mobile communication terminal is connected to the second communication network; and
displaying the first user interface screen in response to an execution of the application corresponding to the icon selected from the second icon group when the mobile communication terminal is not connected to the second communication network.

6. The method of claim 1, wherein the adaptive application is one of a phonebook application, an image display application or a music playing application.

7. The method of claim 1, wherein the second icon group is displayed at a front part of the screen when the mobile communication terminal is connected to the second communication network, and
the first icon group is displayed at the front part of the screen when the mobile communication terminal is not connected to the second communication network.

8. The method of claim 1, further comprising:
displaying the second icon group with a different brightness, size, sharpness or highlighting effect than the first icon group.

9. A mobile communication terminal connectable to a first communication network and a second communication network, the mobile communication terminal comprising:
a display unit configured to display a first icon group and a second icon group;
a wireless communication unit configured to connect to at least one of the first communication network or the second communication network; and
a controller configured to rearrange the first icon group and the second icon group in a distinguishable manner according to a type of the connected communication network,
wherein the controller is further configured to:
determine whether the mobile communication terminal is connected to the second communication network;
control the display unit to display the second icon group ahead of the first icon group in response to the determination that the mobile communication terminal is connected to the second communication network; and
control the display unit to display the first icon group ahead of the second icon group in response to the determination that the mobile communication terminal is not connected to the second communication network, wherein a plurality of icons included in the second icon group correspond to a plurality of adaptive applications that allow the mobile communication terminal to display either a first user interface screen or a second user interface screen depending on the connected communication network.

10. The mobile communication terminal of claim 9, wherein the second communication network has a greater data transfer rate than the first communication network.

11. The mobile communication terminal of claim 9, wherein the first icon group includes a plurality of icons corresponding to a plurality of applications that have a priority in the first communication network, and the second icon group includes the plurality of icons corresponding to the plurality of applications that have a priority in the second communication network.

12. The mobile communication terminal of claim 9, wherein the adaptive application has two modes, and an appropriate mode of the two modes is run based on the determined communication network.

13. The mobile communication terminal of claim 9, wherein the controller is further configured to control the display unit to display the second user interface screen in response to an execution of an application corresponding to an icon selected from the second icon group when the mobile communication terminal is connected to the second communication network, and wherein the controller is configured to control the display unit to display the first user interface screen in response to an execution of the application corresponding to the icon selected from the second icon group when the mobile communication terminal is not connected to the second communication network.

14. The mobile communication terminal of claim 9, wherein the adaptive application is one of a phonebook application, an image display application or a music playing application.

15. The mobile communication terminal of claim 9, wherein the second icon group is displayed at a front part of the display unit when the mobile communication terminal is connected to the second communication network, and the first icon group is displayed at the front part of the display unit when the mobile communication terminal is not connected to the second communication network.

16. The mobile communication terminal of claim 9, wherein the controller is further configured to control the display unit to display the second icon group with a different brightness, size, sharpness or highlighting effect than the first icon group.

* * * * *